US010597234B2

(12) United States Patent
Clucas et al.

(10) Patent No.: US 10,597,234 B2
(45) Date of Patent: Mar. 24, 2020

(54) CARTON UNLOADER TOOL FOR JAM RECOVERY

(71) Applicant: Intelligrated Headquarters, LLC, Mason, OH (US)

(72) Inventors: Dominic George Clucas, Saint Peters, MO (US); Matthew R. Wicks, St. Charles, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 16/009,838

(22) Filed: Jun. 15, 2018

(65) Prior Publication Data

US 2018/0297786 A1 Oct. 18, 2018

Related U.S. Application Data

(63) Continuation-in-part of application No. 15/483,151, filed on Apr. 10, 2017, now Pat. No. 10,239,701.
(Continued)

(51) Int. Cl.
*B65G 37/00* (2006.01)
*B65G 59/02* (2006.01)
(Continued)

(52) U.S. Cl.
CPC ........... *B65G 37/00* (2013.01); *B65G 47/244* (2013.01); *B65G 47/682* (2013.01); *B65G 59/02* (2013.01); *B65G 67/02* (2013.01)

(58) Field of Classification Search
CPC ...... B65G 37/00; B65G 67/24; B65G 47/261; B65G 47/24; B65G 59/02; B65G 43/08
(Continued)

(56) References Cited

U.S. PATENT DOCUMENTS 3,722,661 A * 3/1973 Williams ............... B65G 37/00
198/692
4,955,784 A   9/1990 Staszewski et al.
(Continued)

FOREIGN PATENT DOCUMENTS

CA          2844967 C     2/2016
DE    102011009181 A1    7/2012
(Continued)

OTHER PUBLICATIONS

International Search Report and Written Opinion for PCT/AP2018/000001, dated Nov 16, 2018, 20 pages.
(Continued)

*Primary Examiner* — Gene O Crawford
*Assistant Examiner* — Lester Rushin, III
(74) *Attorney, Agent, or Firm* — Alston & Bird LLP

(57) ABSTRACT

A controller of a robotic material handling system performs a method that conveys articles from a pile within a confined space. One or more articles per operation are robotically moved onto a vertically-positionable nose conveyor surface conveys toward a narrower rearward conveyor. Controller detects a jammed article that is at least partially supported by the nose conveyor and that has failed to fully convey onto the rearward. The controller attempts to dislodge the jammed article by causing at least one of: (i) vertically repositioning the nose conveyor surface; and (ii) activating at least one of the two or more parallel conveyors of the nose conveyor surface to run in a forward direction. After the attempt to dislodge, the controller activates at least one parallel conveyor that is contact with the jammed article in a rearward direction.

17 Claims, 29 Drawing Sheets

Related U.S. Application Data

(60) Provisional application No. 62/410,435, filed on Oct. 20, 2016, provisional application No. 62/413,122, filed on Oct. 26, 2016, provisional application No. 62/417,368, filed on Nov. 4, 2016, provisional application No. 62/544,327, filed on Aug. 11, 2017, provisional application No. 62/546,578, filed on Aug. 17, 2017.

(51) Int. Cl.
*B65G 47/68* (2006.01)
*B65G 67/02* (2006.01)
*B65G 47/244* (2006.01)

(58) Field of Classification Search
USPC .......................................................... 198/437
See application file for complete search history.

(56) References Cited

U.S. PATENT DOCUMENTS

| | | | |
|---|---|---|---|
| 7,896,150 B2 | 3/2011 | Smalley et al. | |
| 8,651,794 B2 | 2/2014 | Pippin | |
| 8,746,437 B2 | 6/2014 | Schiesser et al. | |
| 8,944,239 B2 | 2/2015 | Campbell et al. | |
| 9,102,055 B1 | 8/2015 | Konolige et al. | |
| 9,427,874 B1 | 8/2016 | Rublee | |
| 9,440,349 B2 * | 9/2016 | Criswell | B25J 15/00 |
| 9,511,943 B2 | 12/2016 | Mast et al. | |
| 9,540,172 B2 | 1/2017 | Horn | |
| 9,604,381 B2 | 3/2017 | Michler et al. | |
| 9,604,797 B2 * | 3/2017 | Heitplatz | B65G 67/08 |
| 9,969,573 B2 | 5/2018 | Girtman et al. | |
| 2011/0320042 A1 | 12/2011 | Handelman | |
| 2019/0061981 A1 | 2/2019 | Richards et al. | |
| 2019/0224057 A1 | 7/2019 | Jordan | |

FOREIGN PATENT DOCUMENTS

| | | | |
|---|---|---|---|
| EP | 1205410 A1 | 5/2002 | |
| EP | 2444341 | 4/2012 | |
| IE | 3733461 | 4/1989 | |
| JP | 3232613 A | 10/1991 | |
| JP | 2009-301538 | 11/1997 | |
| JP | 2010-100398 A | 5/2010 | |
| WO | 2006/130420 A2 | 12/2006 | |
| WO | 2007/084606 A2 | 7/2007 | |
| WO | 2009/043151 | 4/2009 | |
| WO | 2012/016974 | 2/2012 | |
| WO | 2015/031670 A1 | 3/2015 | |
| WO | WO 2015/153697 A1 | 10/2015 | |
| WO | WO 2015/187975 A1 | 12/2015 | |
| WO | 2016/033172 A1 | 3/2016 | |

OTHER PUBLICATIONS

International Search Report and Written Opinion for Application No. PCT/US2017/057579 dated Mar. 1, 2018, 10 pages.
Office Action for U.S. Appl. No. 15/483,151 dated Jan. 17, 2018, 11 pages.
European Search Report for Application No. EP 17 19 6946 dated Mar. 28, 2018, 9 pages.
Non-Final Rejection dated Oct. 4, 2018 for U.S. Appl. No. 15/481,969.
Notice of Allowance and Fees Due (PTOL-85) dated Jan. 24, 2019 for U.S. Appl. No. 15/481,969.
Supplementary European search report dated Jan. 4, 2018 for EP Application No. 15803243.3.
Notice of Allowance and Fees Due (PTOL-85) dated Nov. 6, 2018 for U.S. Appl. No. 15/483,151.
Notice of Allowance and Fees Due (PTOL-85) dated Jul. 25, 2018 for U.S. Appl. No. 15/483,151.
Non-Final Rejection dated Jan. 17, 2018 for U.S. Appl. No. 15/483,151.
Extended European Search Report for European Application No. 18248143.2 dated May 9, 2019.
Notice of Allowance for U.S. Appl. No. 16/193,127, dated Nov. 13, 2019, 8 pages.

* cited by examiner

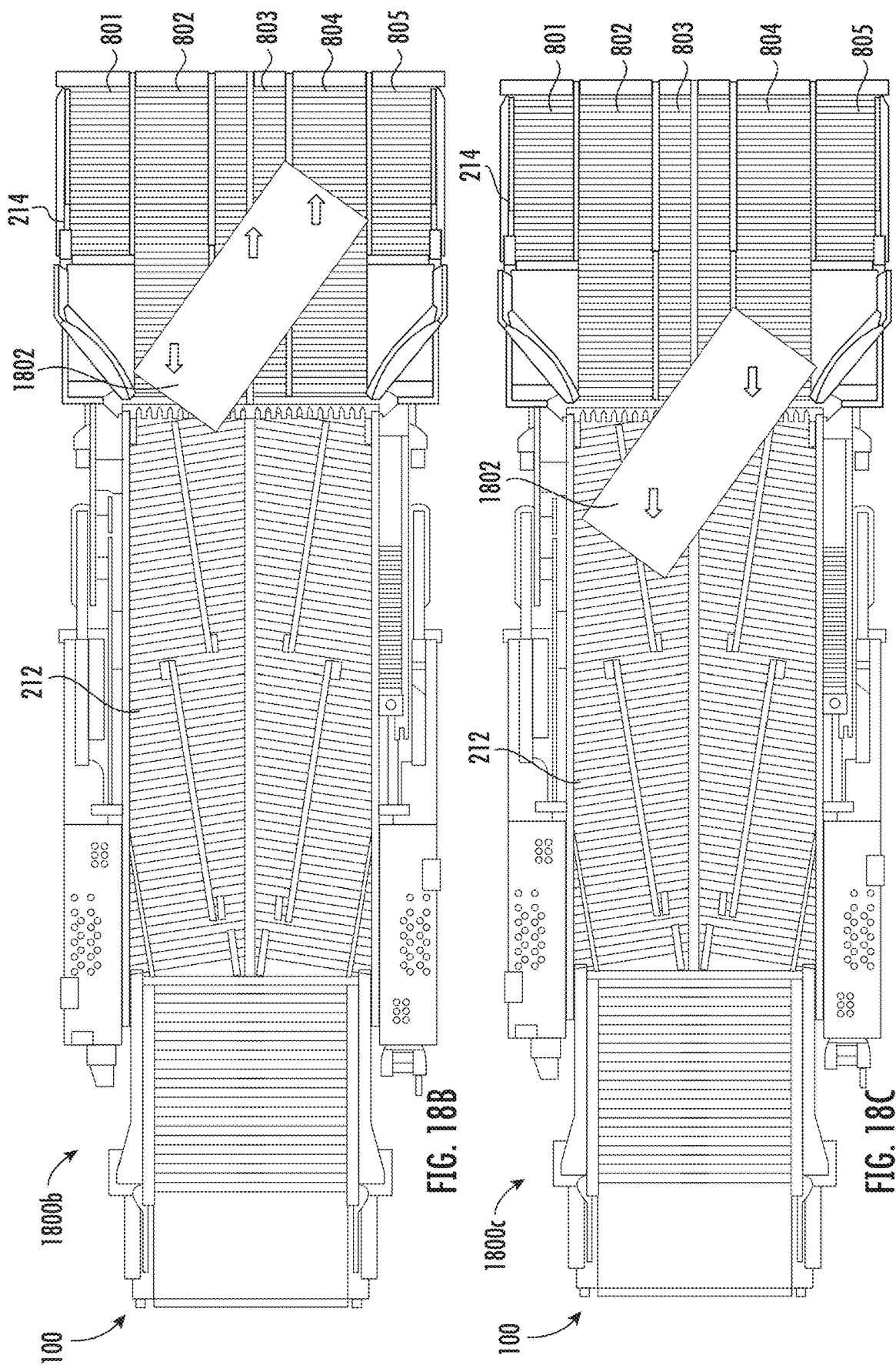

CARTON UNLOADER TOOL FOR JAM RECOVERY

CROSS REFERENCE TO RELATED APPLICATIONS

The present application is a continuation-in-part of U.S. patent application Ser. No. 15/483,151 entitled "Conveyor Screening During Robotic Article Unloading," filed 10 Apr. 2017, that in turn claims the benefit of U.S. Provisional application No. 62/410,435, filed on 20 Oct. 2016, and 62/413,122 filed on 26 Oct. 2016, both entitled "3D-2D Vision System for Robotic Carton Unloading," and U.S. Provisional Patent Application No. 62/417,368, entitled "Conveyor Screening During Robotic Article Unloading," filed on 4 Nov. 2016.

This application also claims the benefit of U.S. Provisional Patent Application No. 62/544,327, entitled "Carton Unloader Tool Jam Recovery," filed on 11 Aug. 2017, and U.S. Provisional Patent Application No. 62/546,578, entitled "Carton Unloader Tool Jam Recovery," filed on 17 Aug. 2017, the disclosures of which are hereby incorporated by reference in their entirety.

TECHNICAL FIELD

The present disclosure generally relates to autonomous carton unloaders and more particularly to an autonomous carton unloader that unloads and conveys articles as part of the material handling system.

BACKGROUND

Trucks and trailers loaded with cargo and products move across the country to deliver products to commercial loading and unloading docks at stores, warehouses, and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically loaded and unloaded with forklifts if the loads are palletized and with manual labor if the products are stacked within the trucks. Unloading large truck shipments manually with human laborers can be physically difficult, and can be costly due to the time and labor involved. In addition, hot or cold conditions within a confined space of a truck trailer or shipping container can be deemed unpleasant work. Consequently, a need exists for an improved unloading system that can unload bulk quantities of stacked cases and cargo from truck trailers more quickly than human laborers and at a reduced cost.

In order to be economical, automation of loading or unloading needs to be relatively fast. Generally-known approaches to unloading cartons have extremely limited acceptance. Each carton is generally conveyed rearward in a singulated fashion, limiting the rate at which cartons can be unloaded. Attempting to simultaneously convey unsingulated articles can cause the articles to jam, which creates a time consuming manual procedure for shutting down the unloading process and attempting to access the inserted end of the unloader within the confined space of a shipping container or truck trailer.

Applicant has identified a number of deficiencies and problems associated with conventional methods of trucks and trailers unloading. Through applied effort, ingenuity, and innovation, many of these identified problems have been solved by developing solutions that are included in embodiments of the present disclosure, many examples of which are described in detail herein.

BRIEF SUMMARY

In one aspect, the present disclosure provides a method of conveying articles on a robotic material handling system. In one or more embodiments, the method includes positioning a nose conveyor surface of the robotic material handling system proximate to an article pile, the nose conveyor surface being vertically-movable and having two or more parallel conveyors that are distal to and feed a rearward conveyor, the rearward conveyor being laterally narrower than the nose conveyor surface; robotically moving one or more articles onto the nose conveyor surface from the article pile; activating at least one of the two or more parallel conveyors of the nose conveyor surface to convey at least one article from the nose conveyor surface toward the rearward conveyor; detecting a jammed article that is at least partially supported by the nose conveyor surface and that has failed to be fully conveyed onto the rearward conveyor by the at least one of the two or more parallel conveyors; dislodging the jammed article by causing at least one of: (i) vertically repositioning the nose conveyor surface; and (ii) activating the at least one of the two or more parallel conveyors of the nose conveyor surface to run in a forward direction; and activating at least one parallel conveyor that is in contact with the jammed article in a rearward direction.

In another aspect, detecting the jammed article comprises: scanning the nose conveyor surface; identifying one or more articles that are present on the nose conveyor surface within respective zones of the two or more parallel conveyors by comparing the scanned nose conveyor surface to a baseline scan of an empty nose conveyor surface; tracking the at least one article within an identified zone of the at least one of the two or more parallel conveyors of the nose conveyor surface; and based on tracking the at least one article, determining that the at least one article has become the jammed article by failing to be conveyed onto the rearward conveyor.

In another aspect, dislodging the jammed article comprises vertically repositioning the nose conveyor surface; and activating the at least one parallel conveyor that is contact with the jammed article in the rearward direction comprises activating the at least one parallel conveyor of the nose conveyor surface and at least a portion of the rearward conveyor.

In another aspect, repositioning the nose conveyor surface comprises raising the nose conveyor surface.

In another aspect, repositioning the nose conveyor surface comprises lowering the nose conveyor surface to a homed position in alignment with the rearward conveyor.

In another aspect, dislodging the jammed article comprises activating at least one of the two or more parallel conveyors of the nose conveyor surface to run in the forward direction away from the rearward conveyor.

In another aspect, the method further comprises activating at least another one of the two or more parallel conveyors simultaneously with the at least one of the two or more parallel conveyors in the rearward direction to rotate the jammed article into longitudinal alignment with the rearward conveyor.

In another aspect, the present disclosure provides a robotic material handling system for unloading articles in an article pile. The robotic material handling system is movable across a floor. In one or more embodiments, the robotic material handling system includes a mobile body and a movable robotic manipulator attached to the mobile body and comprising an end effector at an end thereof. The end effector is configured to unload one or more articles from the article pile. The robotic material handling system also includes a conveyor system mounted on the mobile body. The conveyor system is configured to receive the one or more cartons from the end effector and to move the one or more articles towards a rear of the robotic material handling system. The conveyor system comprising: (i) a nose conveyor surface and (ii) a rearward conveyor. The nose conveyor surface has two or more parallel conveyors that are distal to and proximally feed the rearward conveyor that is laterally narrower than the nose conveyor surface.

In another aspect, the robotic material handling system also includes an article detection system and a controller in communication with the article detection system, the mobile body, the mobile robotic manipulator, and the conveyor system. The controller is configured to: cause the nose conveyor surface of the robotic material handling system to be positioned proximate to the article pile, the nose conveyor surface being vertically-movable; cause the movable robotic manipulator to move the one or more articles onto the nose conveyor surface from the article pile; activate at least one of two or more parallel conveyors of the nose conveyor surface to convey at least one article from the nose conveyor surface toward the rearward conveyor; detect a jammed article that is at least partially supported by the nose conveyor surface and that has failed to be fully conveyed onto the rearward conveyor by the at the least one of the two or more parallel conveyors; and dislodge the jammed article by causing at least one of: (i) vertically repositioning the nose conveyor surface; and (ii) activating the at least one of the two or more parallel conveyors of the nose conveyor surface to run in a forward direction; and activate at least one parallel conveyor that is in contact with the jammed article in a rearward direction.

In another aspect, the controller is configured to dislodge the jammed article by vertically repositioning the nose conveyor surface to a selected one of: (i) raising the nose conveyor surface relative to the rearward conveyor; and (ii) lowering the nose conveyor surface to a homed position in alignment with the rearward conveyor, wherein activating the at least one parallel conveyor that is in contact with the jammed article in the rearward direction comprises activating the at least one parallel conveyor of the nose conveyor surface and at least a portion of the rearward conveyor. In another aspect, dislodging the jammed article comprises activating at least one of the two or more parallel conveyors of the nose conveyor surface to run in the forward direction away from the rearward conveyor. In another aspect, the controller is further configured to: activate at least another one of the two or more parallel conveyors simultaneously with the at least one of the two or more parallel conveyors in the rearward direction to rotate the jammed article into longitudinal alignment with the rearward conveyor.

In another aspect, the article detection system comprises one or more sensors coupled respectively to one of the mobile body and the movable robotic manipulator to scan the nose conveyor surface; a scan processing subsystem in communication with the one or more sensors, the scan processing subsystem to detect presence and location of any articles based upon a received scan of the nose conveyor surface as compared to a baseline scan; and wherein the controller in communication with the scan processing subsystem detects the jammed article by: scanning, by the one or more sensors, the nose conveyor surface; identifying, by the scan processing subsystem, one or more articles that are present on the nose conveyor surface within respective zones of the two or more parallel conveyors by comparing the scanned nose conveyor surface to a baseline scan of an empty nose conveyor surface; tracking the at least one article within an identified zone of the at least one of two or more parallel conveyors of the nose conveyor surface; and based on tracking the at least one article, determining that the at least one article has become the jammed article by failing to be conveyed onto the rearward conveyor.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 18B illustrates a top view of the nose conveyor surface having a portion of the long article conveyed forward to rotate at least partially into longitudinal alignment, according to one or more embodiments;

FIG. 18C illustrates a top view of the nose conveyor surface rearwardly conveying the partially longitudinally aligned article, according to one or more embodiments;

DETAILED DESCRIPTION

Figure 1:
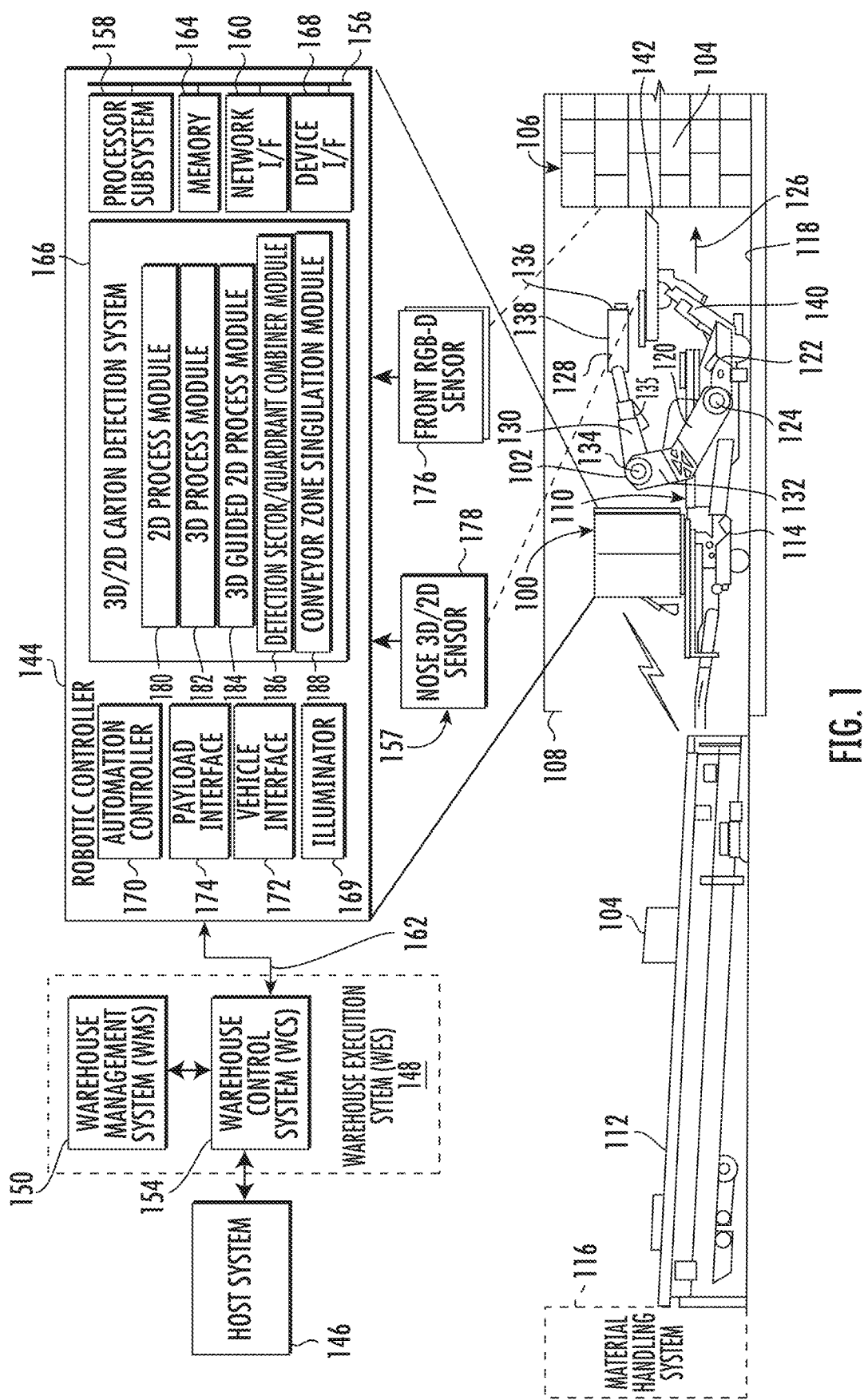
FIG. 1 illustrates a side view with functional block diagram of a robotic material handling system and extendable conveyor unloading cartons from within a carton pile container using a vision system that is multi-quadrant and combined two-dimensional (2D) and three-dimensional (3D), according to one or more embodiments.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this description is not meant to be limiting insofar as embodiments described herein, or portions thereof, may be attached or utilized in other orientations.

In one or more aspects of the present disclosure, a controller of a robotic material handling system performs a method that conveys articles from a pile within a confined space. In one or more embodiments, the controller includes a computer-readable storage medium containing instructions. When executed by a processor, the instructions cause the robotic material handling system to position a vertically-movable nose conveyor surface of a robotic material handling system proximate to an article pile. The nose conveyor surface has two or more parallel conveyors that are distal to and proximally feed a rearward conveyor that is laterally narrower than the nose conveyor surface. One or more articles per operation are robotically moved onto the nose conveyor surface from the article pile. At least one of two or more parallel conveyors of the nose conveyor surface are activated to convey at least one article from the nose conveyor toward the rearward conveyor. The controller detects a jammed article that is at least partially supported by the nose conveyor. The jammed article has failed to fully convey onto the rearward conveyor in correspondence to the activated at the least one or two or more parallel conveyors. The controller attempts to dislodge the jammed article by causing at least one of: (i) vertically repositioning the nose conveyor surface; and (ii) activating at least one of the two or more parallel conveyors of the nose conveyor surface to run in a forward direction. After the attempt to dislodge, the controller activates at least one parallel conveyor that is contact with the jammed article in a rearward direction.

Robotic carton loader or unloader incorporates three-dimensional (3D) and two-dimensional (2D) sensors to detect respectively a 3D point cloud and a 2D image of a carton pile within transportation carrier such as a truck trailer or shipping container. Edge detection is performed using the 3D point cloud, discarding segments that are too small to be part of a product such as a carton. Segments in the 2D image of the carton pile that are too large to correspond to a carton are processed to detect additional edges. Results from 3D and 2D edge detection are converted in a calibrated 3D space of the material carton loader or unloader to perform one of loading or unloading of the transportation carrier. Image processing can also detect potential jamming of products sequence from individually controllable parallel conveyors of a nose conveyor surface of the robotic carton loader or unloader.

In one aspect of the present disclosure, a customized Red-Green-Blue and Depth (RGB-D) vision solution is provided for autonomous truck unloaders. A RGB-D sensor system was designed using a combination of industrial Depth and RGB sensor specifically tailored to the needs of a truck unloader as a rugged industrial solution that provides high quality data at the required speed, resolution, and field of view needed for object recognition. Four such units combined gives the RGB, depth and RGB-D data across the entire width and height of a trailer. Each of the RGB cameras has unique projection parameters. Using those and the relative position of the Depth and RGB sensor, the 3D from the depth sensor is mapped onto 2D RGB image data from RGB sensor and vice versa. The data from 3D and 2D RGB can be stitched together on the higher level to obtain an entire scene.

In one exemplary embodiment, a 3D sensor performs conveyor screening operation. Using 3D point cloud data, infrared image, and depth map as an input data, two 3D sensing devices cover the whole conveyor region. The 3D point cloud data is used to estimate the height of the box. The tallest box is taken into account to make a decision using a threshold to predict a conveyor jam scenario. A threshold value can be set slightly less than conveyor clearance for product discharge from the truck unloader itself or a downstream clearance. Depth map or infrared image is used to perform conveyor screening to detect the presence of the product on the conveyor. A conveyor template with no product is compared to the input to obtain a difference image. The difference image is evaluated using predefined zones. An array of product present in various zones of the conveyor are provided. From these, sequenced singulation operations can be constructed to expedite discharge. In one aspect, the conveyor template includes a baseline scan of the conveyor from a 3D sensor is required as a basis for comparison. The baseline scan can be captured and used perpetually or be acquired at startup. The cameras are placed such that the field of view covers the entire area of interest. Perspective is important to minimize shadowing. Active noise sources should be detected and reduced. Occluding, moving, or eliminating the detected noise sources is preferred. For example, having multiple 3D sensors can create situations where one 3D sensor introduces noise on the other. Thus, each 3D sensor may be sequenced such that no two 3D sensors sharing the same field of view are active at the same time. The area of interest and the contained zones are identified within the given field of view.

In one aspect of the present disclosure, during setup, a baseline scan from a 3D sensor can be used as a basis for comparison. The baseline scan can be captured and used perpetually or be acquired at startup. Further, the cameras can be placed such that the field of view covers the entire area of interest. Perspective can minimize shadowing. Further, active noise sources may be detected and reduced. The detected noise sources may be occluded, moved, and/or eliminated. The area of interest and the contained zones may be identified within the given field of view.

In one aspect of the present disclosure, during runtime, the conveyor screening operation may be triggered from an external source, for example, a PLC. A response may confirm the receipt of the trigger. This may be a periodic message response of which zones are occupied in the area of interest within the field of view. Further, internally the sensor may be triggered to capture images at a rate preferred to minimize idle time and maintain the ideal response time to the monitoring system (e.g. PLC). Captured frames from the sensor may be compared against the based frame to identify any product in the given zones. If a product is detected in a given zone, a zone occupy bit is set to true for that zone and sent back to the monitoring system (e.g. PLC). Further, the monitoring system may send a trigger off message to the unloader until the responses cease.

In some embodiments, there are two "roles" in this system—the "operator" and the "maintainer." The operator engages the controlling system (e.g. PLC) and thereby trigger the conveyor screen application on and off. The maintainer can manage the positioning of sensors relative to the area of interest; reduce or eliminate sensor noise sources; adjust any filtering levels; and potentially capture the baseline scan to begin operation. These roles could be automated.

After commissioning the robotic carton unloader, the lifetime is expected to be long. Average ambient operating temperature, source voltage consistency, shock and vibration isolation, isolation from high power emitters, if controlled properly, will extend the life of the sensors and the system. At the end of life per component, more false positives and false negatives are expected. Dead points can be monitored on the sensor to the point that when a minimum number of points is reached, the sensor can be flagged for replacement. Component pieces are serviceable assuming original parts or compatible replacements can be sourced.

In one aspect, sensor setup for conveyor screening for product detection is faster and provide zone info for smarter operation of conveyor system, which results in a decrease in cycle time of overall machine and an increase the efficiency of the machine. Two 3D sensor system provides higher field of view of conveyor minimizes false positive detections and provides reliable and robust conveyor screening when compared to traditional Light Detection and Ranging (LiDAR)'s which limits its capabilities in providing detection only in 2D space. Conveyor jam recovery mode helps controls systems to react appropriately in case of taller cases or multi stacked cases on the conveyor.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a robotic material handling system 100 having a manipulator such as a robotic arm assembly 102 unloads cartons 104 from a carton pile 106 inside of a carton pile container 108, such as a trailer, shipping container, storage unit, etc. Robotic arm assembly 102 places the cartons 104 onto a conveyor system 110 of the robotic material handling system 100 that conveys the cartons 104 back to an extendable conveyor 112 that follows a mobile body 114 of the robotic material handling system 100 into the carton pile container 108. The extendable conveyor 112 in turn conveys the cartons 104 to a material handling system 116 such as in a warehouse, store, distribution center, etc.

In one or more embodiments, the robotic material handling system 100 autonomously unloads a carton pile 106 resting on a floor 118 of the carton pile container 108. The mobile body 114 is self-propelled and movable across the floor 118 from outside to the innermost portion of the carton pile container 108. Right and left lower arms 120 of the robotic arm assembly 102 are pivotally attached at a lower end 122 respectively to the mobile body 114 on opposing lateral sides of the conveyor system 110 passing there between. The right and left lower arms 120 rotate about a lower arm axis 124 that is perpendicular to a longitudinal axis 126 of the conveyor system 110. An upper arm assembly 128 of the robotic arm assembly 102 has a rear end 130 pivotally attached at an upper end 132 respectively of the right and left lower arms 120 to pivotally rotate about an upper arm axis 134 that is perpendicular to the longitudinal axis 126 of the conveyor system 110 and parallel to the lower arm axis 124. A manipulator head 136 is attached to a front end 138 of the upper arm assembly 128 and engages at least one carton 104 at a time from the carton pile 106 resting on the floor 118 for movement to the conveyor system 110. The pivotal and simultaneous mirrored movement of the right and left lower arms 120 maintains the upper arm axis 134 at a relative height above the conveyor system 110 that enables the at least one carton 104 to be conveyed by the conveyor system 110 without being impeded by the robotic arm assembly 102 as soon as the manipulator head 136 is clear. In one or more embodiments, the robotic material handling system 100 includes a lift 140 attached between the mobile body 114 and a front portion 142 of the conveyor system 110. The lift 140 moves the front portion 142 of the conveyor system 110 relative to the floor 118 to reduce spacing underneath the at least one carton 104 during movement from the carton pile 106 to the conveyor system 110.

A higher level system can assign an autonomous robotic vehicle controller 144 of the robotic material handling system 100 to a particular carton pile container 108 and can receive information regarding progress of loading/unloading as well as provide a channel for telecontrol. A human operator could selectively intervene when confronted with an error in loading or unloading. The higher level system can include a host system 146 that handles external order transactions that are to be carried out by the material handling system 116. Alternatively or in addition, a warehouse execution system (WES) 148 can provide vertical integration of a warehouse management system (WMS) 150 that performs order fulfillment, labor management, and inventory tracking for a facility such as a distribution center. WES 148 can include a vertically integrated warehouse control system (WCS) 154 that controls automation that carries out the order fulfillment and inventory movements requested by the WMS 150.

In one or more embodiments, once assigned by the WES 148 or manually enabled, the robotic material handling system 100 can operate autonomously under control of the WCS 154 in: (i) moving into a carton pile container 108, (ii) performing one of loading or unloading the carton pile container 108, and (iii) moving out of the carton pile container 108. In order to navigate within the carton pile container 108 and to expeditiously handle cartons 104 therein, a carton detection system 166 of the WCS 154 includes sensors 157 (including the nose 3D/2D sensors 178 and Front 3D/2D sensors 176) attached respectively to one of the mobile body 114 and the movable robotic manipulator (robotic arm assembly 102) to provide a two-dimensional (2D) RGB image and a three-dimensional (3D) point cloud of at least one portion of the carton pile 106 resting on the floor 118 of a carton pile container 108. The carton pile container 108 can be stationery or mobile, such as transportation carriers for highway, railway or shipping on navigable waters.

Controller 144 provides an exemplary environment within which one or more of the described features of the various embodiments of the disclosure can be implemented. A controller 144 can be implemented as a unitary device or distributed processing system. The controller 144 includes functional components that communicate across a system interconnect of one or more conductors or fiber optic fabric that for clarity is depicted as a system bus 156. System bus 156 may include a data bus, address bus, and control bus for communicating data, addresses and control information between any of these coupled units. Functional components of the controller 144 can include a processor subsystem 158 consisting of one or more central processing units (CPUs), digital signal processor/s (DSPs) and processor memory. Processor subsystem 158 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes including control of automation equipment of a material handling system.

In accordance with various aspects of the disclosure, an element, or any portion of an element, or any combination of elements may be implemented with processor subsystem 158 that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result.

Controller 144 may include a network interface (I/F) device 160 that enables controller 144 to communicate or interface with other devices, services, and components that are located external to controller 144, such as WES 148. These networked devices, services, and components can interface with controller 144 via an external network, such as example network 162, using one or more communication protocols. Network 162 can be a local area network, wide area network, personal area network, and the like, and the connection to and/or between network and controller 144 can be wired or wireless or a combination thereof. For purposes of discussion, network 162 is indicated as a single collective component for simplicity. However, it is appreciated that network 162 can comprise one or more direct connections to other devices as well as a more complex set of interconnections as can exist within a wide area network, such as the Internet or on a private intranet. Various links in the network 162 can wired or wireless. Controller 144 can communicate via a device interface 168 with a number of on-board devices such as lights, indicators, manual controls, etc. Device interface 168 can include wireless links and wired links. For example, the controller 144 can direct the extendable conveyor 112 follow the robotic material handling system 100 into the carton pile container 108 or to lead the robotic material handling system 100 out of the carton pile container 108.

Controller 144 can include several distributed subsystems that manage particular functions of the robotic material handling system 100. An automation controller 170 can receive location and spatial calibration information from the 3D/2D carton detection system 166 and use this data to coordinate movement of the mobile body 114 via a vehicle interface 172 and movement by payload components such as robotic arm assembly 102 and the lift 140 that moves the front portion 142 of the conveyor system 110. The controller 144 may further include a payload interface 174.

The 3D/2D carton detection system 166 can include depth sensing using binocular principles, radar principles, or sonar principles. To avoid dependency on consistent ambient lighting conditions, an illuminator 169 can provide a consistent or adjustable amount of illumination in one or more spectrum bandwidths such as visual light or infrared. The illumination can be narrowly defined in the visual spectrum enabling filtration of most of the ambient light. Alternatively, the illumination can be outside of the visual range such that the illumination is not distracting to human operators. The 3D/2D carton detection system 166 can receive 2D and 3D sensor data from front RGB-D sensors 176 that view an interior of the carton pile container 108 and the carton pile 106. Nose 3D/2D sensor(s) 178 can view the front portion 142 of the conveyor system 110 to detect dimensions of and where cartons 104 are received for purposes such as jam mitigation, efficient singulation control of side-by-side cartons 104, etc. For these and other purposes, the 3D/2D carton detection system 166 can include various applications or components that perform processes described later in the present application. For example, the 3D/2D carton detection system 166 can include a 2D process module 180, a 3D process module 182, 3D-guided 2D process module 184, a detection sector/quadrant combiner module 186, and a conveyor zone singulation module 188.

System memory 164 can be used by processor subsystem 158 for holding functional components such as data and software such as a 3D/2D carton detection system 166. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, function block diagram (FBD), ladder diagram (LD), structured text (ST), instruction list (IL), and sequential function chart (SFC) or otherwise. The software may reside on a computer-readable medium.

For clarity, system memory 164 can include both random access memory, which may or may not be volatile, nonvolatile data storage. System memory 164 contain one or more types of computer-readable medium, which can be a non-transitory. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 2:
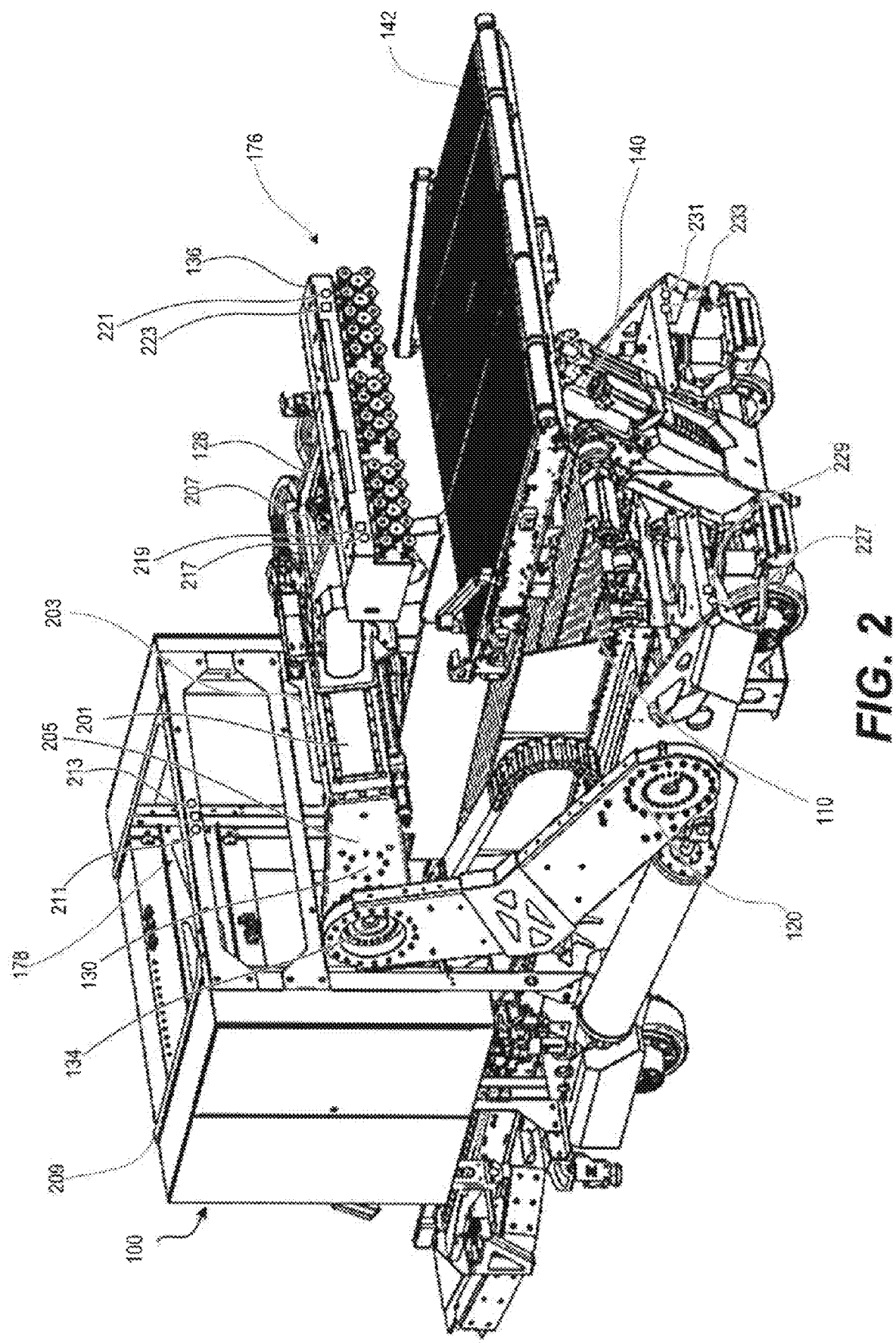
FIG. 2 illustrates a top isometric view of the robotic material handling system of FIG. 1, according to one or more embodiments.

FIG. 2 illustrates that the upper arm assembly 128 of the robotic material handling system 100 includes a rotatable gantry 201 having the rear end 130 pivotally attached at the upper arm axis 134 to the left and right lower arms 120. A central mounting surface 135 extends below the rotatable gantry 201. The rotatable gantry 201 has a lateral guide 203 at an extended end 205. The upper arm assembly 128 includes an end arm 207 proximally attached for lateral movement to the lateral guide 203 of the rotatable gantry 201 and distally attached to the manipulator head 136. The end arm 207 laterally translates to reach an increased lateral area. Thereby a lighter weight and more maneuverable manipulator head 136 can be employed. FIGS. 2-5 illustrate that an equipment cabinet 209 arches over a rearward conveyor 212 of the conveyor system 110. With particular reference to FIG. 5, clearance under the equipment cabinet 209 defines a jam height 210 that can be determined based upon sensor data from nose 3D/2D sensors 178 mounted on the equipment cabinet 209 for any cartons received on a nose conveyor surface 214 of the front portion 142 of the conveyor system 110.

Figure 3:
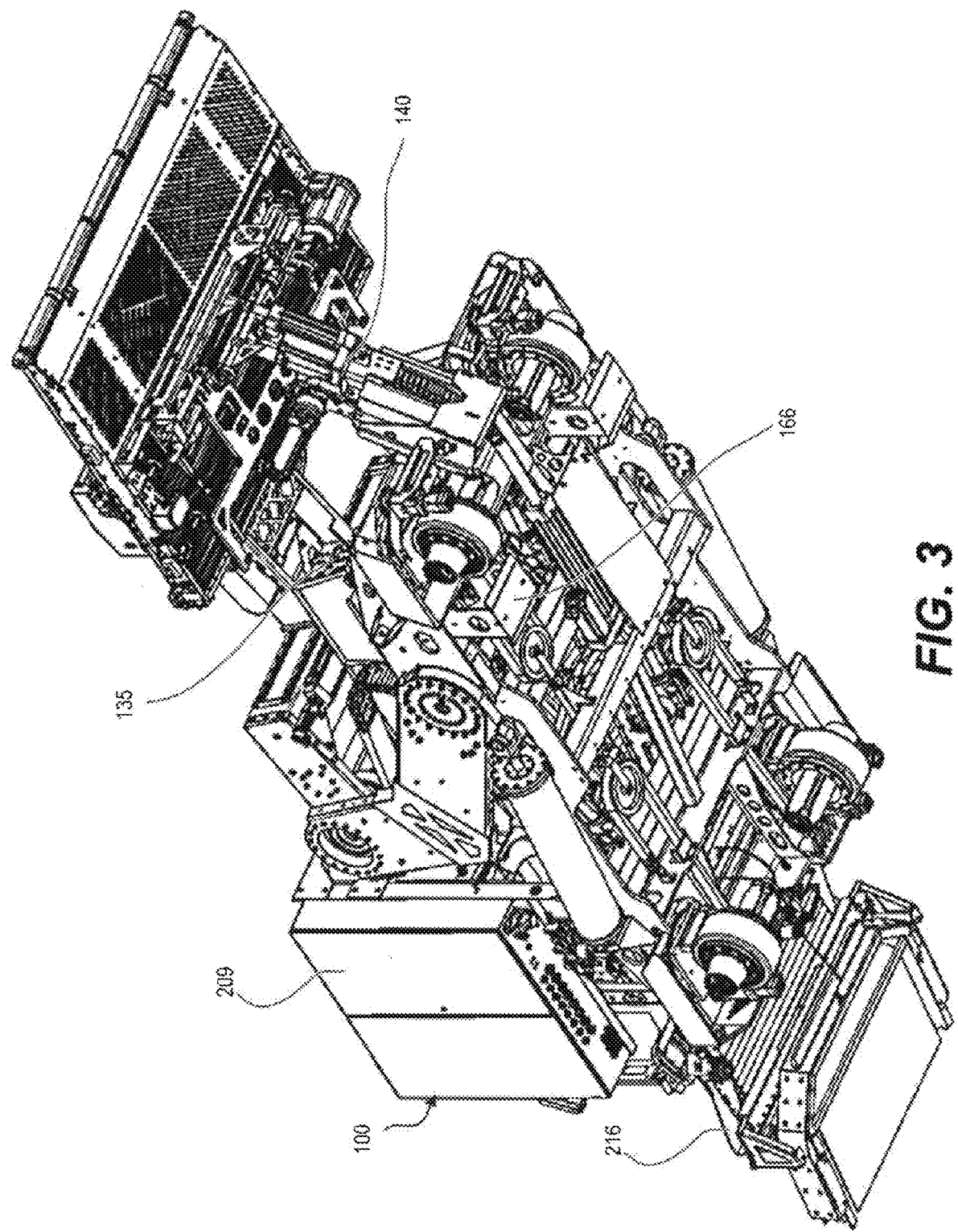
FIG. 3 illustrates a bottom isometric view of the robotic material handling system of FIG. 1, according to one or more embodiments.

In an exemplary embodiment, For example, the nose 3D/2D sensors 178 can include right nose sensor 211 that views a right side of the nose conveyor surface 214 and a left nose sensor 213 that views a left side of the nose conveyor surface 214. Each nose sensor 211, 213 can include one or more of a 2D infrared sensor, a 3D depth sensor, and a 2D RGB sensor. Front 3D/2D sensors 176 can include spatially separated sensors that operate in different spectrum and dimensions in order to detect articles such as product, cartons, boxes, cases, totes, etc., (cartons 104) under a number of stacking arrangements, lighting conditions, etc. Mounting sensors on the end effector (manipulator head 136) also allows varying a vantage point, such as looking downward onto the carton pile 106 to better differentiate top-most cartons 104. With particular reference to FIG. 3, a laterally-shifting transition conveyor 216 conveys articles from the rearward conveyor 212 onto the extendable conveyor 112.

Figure 4:
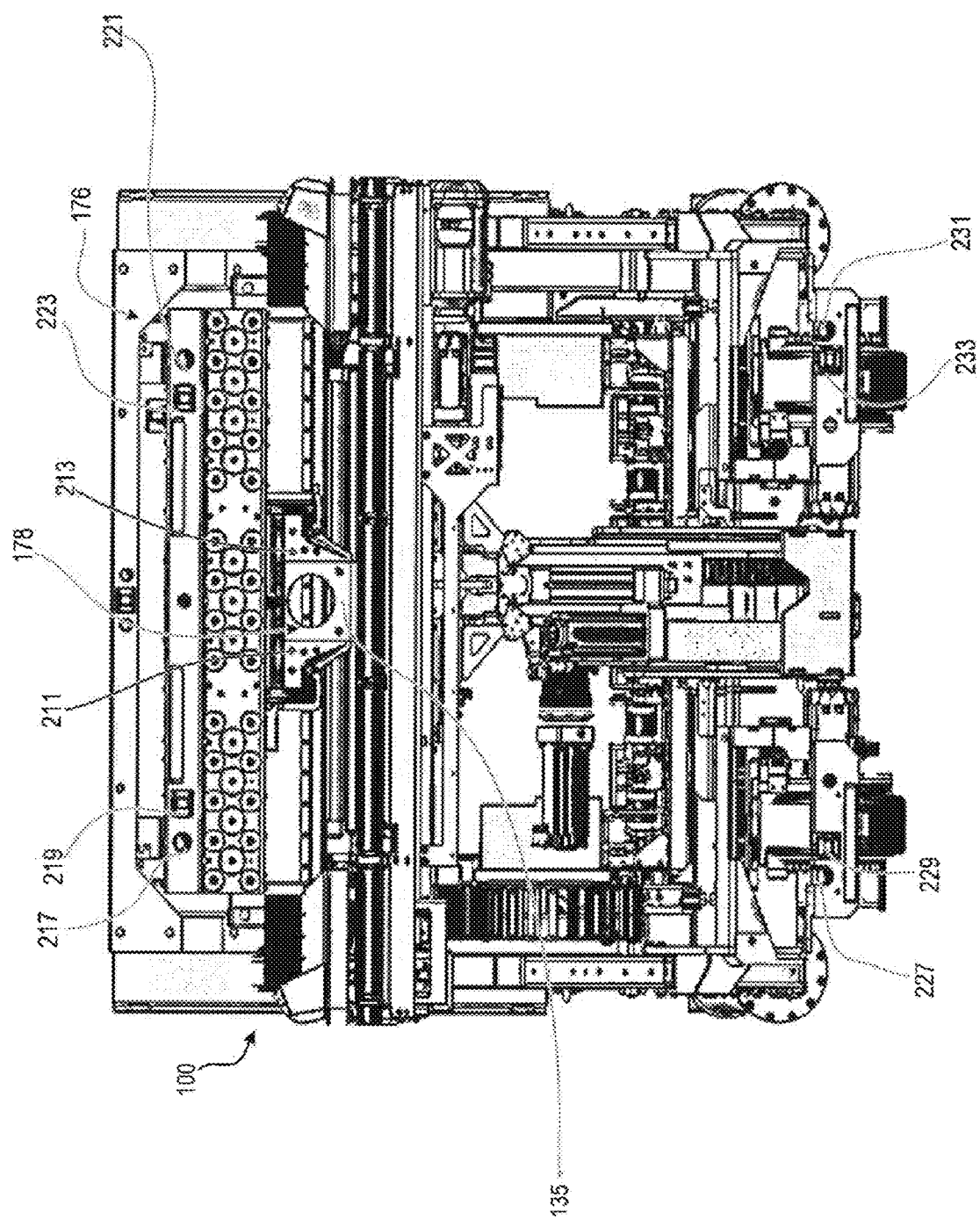
FIG. 4 illustrates a front side view of a front portion of the robotic material handling system of FIG. 1, according to one or more embodiments.
Figure 5:
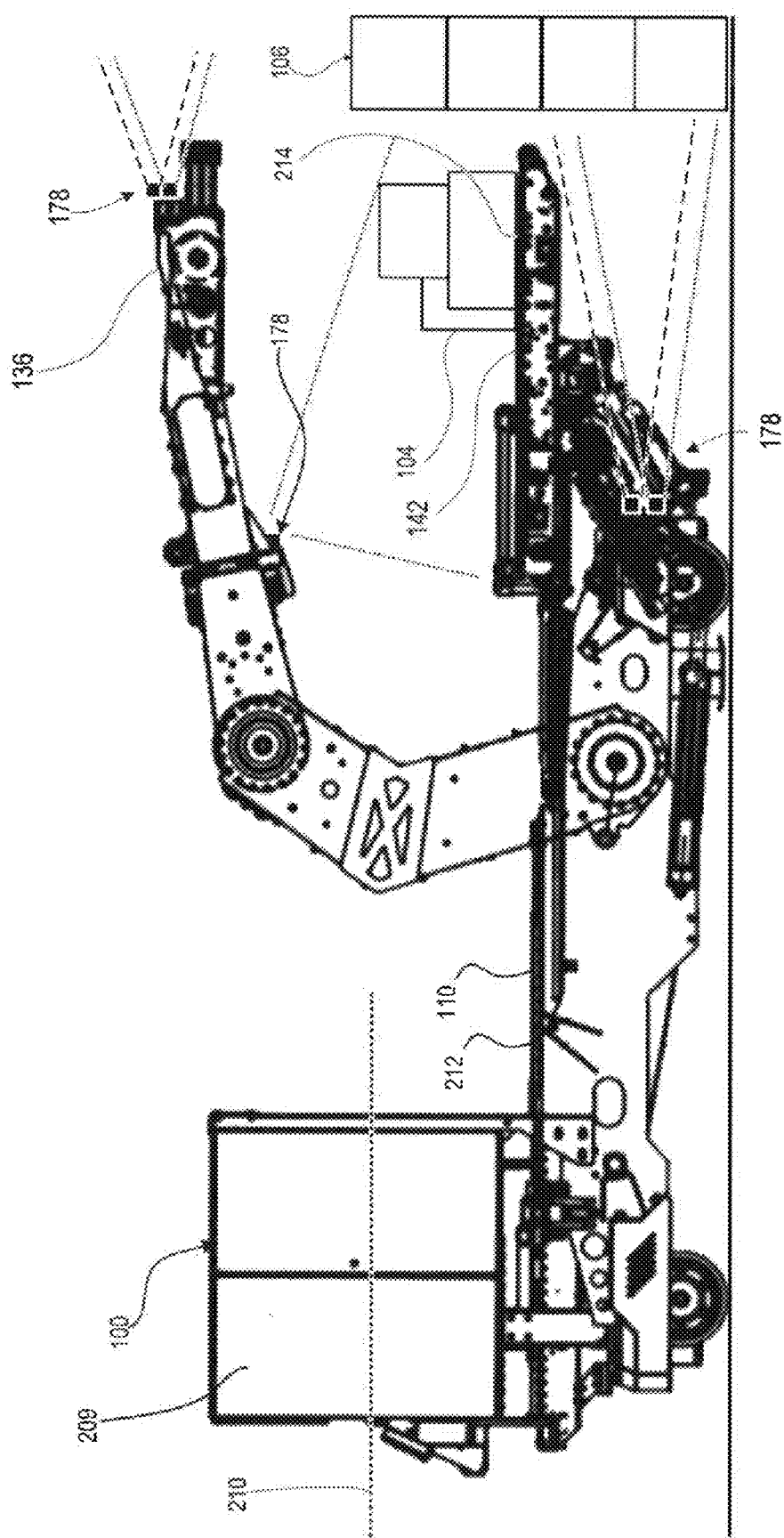
FIG. 5 illustrates a right side view of a front portion of the robotic material handling system of FIG. 1, according to one or more embodiments.

With particular reference to FIGS. 2 and 4, in an exemplary embodiment the front 3D/2D sensors 176 include a top left 2D sensor 217, a top left 3D sensor 219, a top right 2D sensor 221, and a top right 3D sensor 223 on the manipulator head 136. The front 3D/2D sensors 176 include bottom left 2D sensor 227, a bottom left 3D sensor 229, a bottom right 2D sensor 231, and a bottom right 3D sensor 233 on the front end of the mobile body 114.

Figure 6:
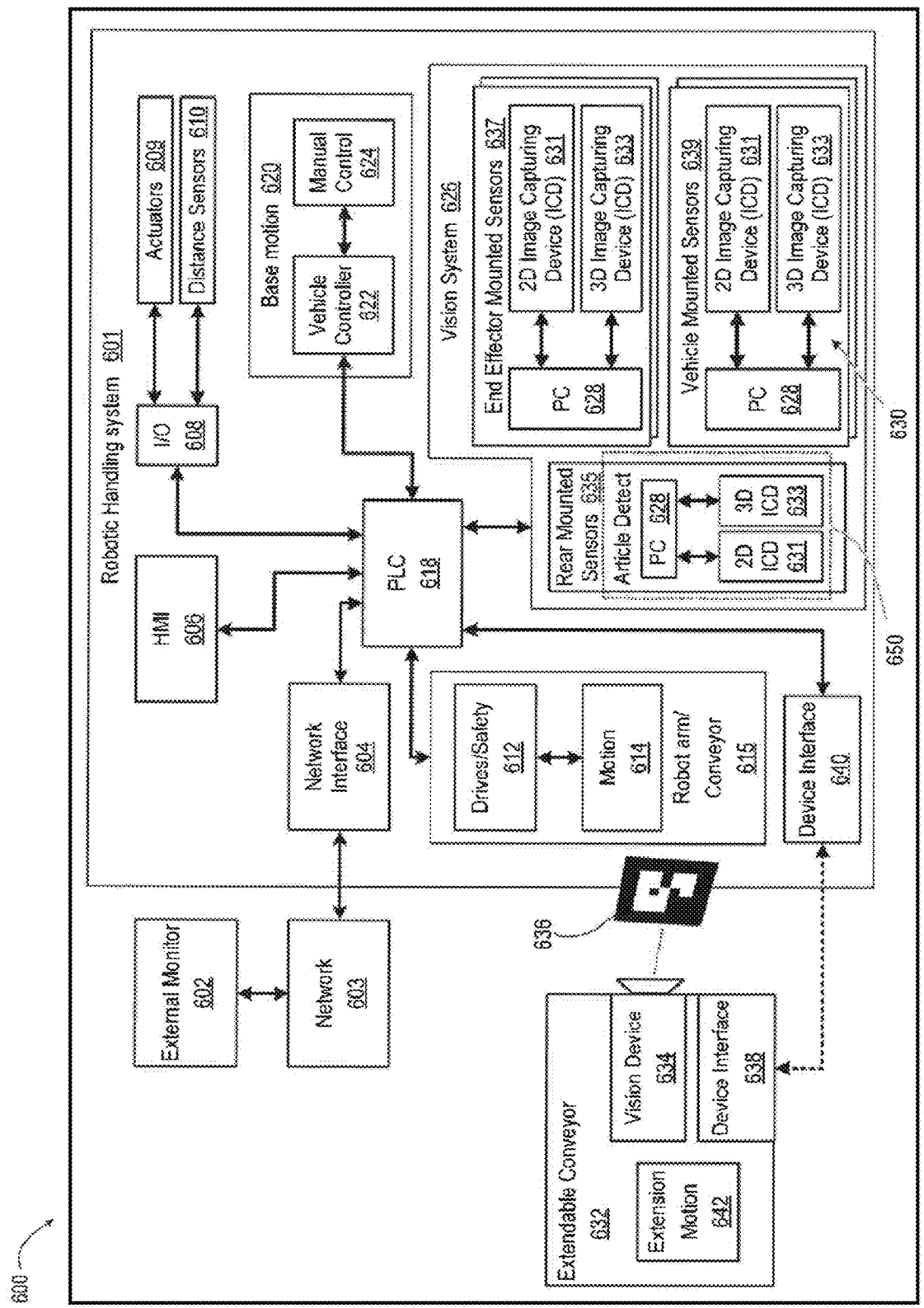
FIG. 6 illustrates a block diagram of an exemplary computing environment for an onboard unloading controller of the robotic material handling system of FIG. 1, according to one or more embodiments.

FIG. 6 illustrates exemplary components of a material handling system 600 that includes robotic material handling system 601 suitable for use in various embodiments. The robotic material handling system 601 may include an external monitor 602, a network interface module 604, an human machine interface (HMI) module 606, an input/output module (I/O module 608), a robotic arm and a conveyor system 615 that includes a drives/safety module 612 and a motion module 614, a programmable logic controller (or PLC 618), a base motion module 620 that includes a vehicle controller module 622 and a manual control module 624, and a vision system 626 (or visualization system) that may include one or more personal computing devices 628 (or "PCs") and sensor devices 630. In some embodiments, vision system 626 of the robotic material handling system 601 may include a PC 628 connected to each sensor device 630. In embodiments in which more than one sensor device 630 is present on the robotic material handling system 601, the PCs 628 for each sensor device 630 may be networked together and one of the PCs 628 may operate as a master PC 628 receiving data from the other connected PCs 628, may perform data processing on the received data and its own data (e.g., coordinate transformation, duplicate elimination, error checking, etc.), and may output the combined and processed data from all the PCs 628 to the PLC 618. In some embodiments, the network interface module 604 may not have a PLC inline between itself and the PC 628, and the PLC 618 may serve as the Vehicle Controller and/or Drives/Safety system. Sensor devices 630 can include 2D image capturing devices (ICDs) 631 and 3D image capturing devices (ICDs) 633 segregated into sectors for different viewing portions or vantage points. Subsets can include rear mounted sensors 635, end effector mounted sensors 637, and vehicle mounted sensors 639.

The robotic material handling system 601 may connect to remote locations or systems with the network interface module 604 (e.g., a Wi-Fi™ radio, etc.) via a network 603, such as a local area Wi-Fi™ network. In particular, the network interface module 604 may enable the robotic material handling system 601 to connect to an external monitor 602. The external monitor 602 may be anyone of a remote warehouse or distribution center control room, a handheld controller, or a computer, and may provide passive remote viewing through the vision system 626 of the robotic material handling system 601. Alternately, the external monitor 602 may override the programming inherent in the vision system 626 and assume active command and control of the robotic material handling system 601. Programming for the robotic material handling system 601 may also be communicated, operated and debugged through external systems, such as the external monitor 602. Examples of an external monitor 602 that assumes command and control may include a remotely located human operator or a remote system, such as a warehouse or distribution server system (i.e., remote device as described above). Exemplary embodiments of using an external monitor 602 to assume command and control of the robotic material handling system 601 may include human or computer intervention in moving the robotic material handling system 601, such as from one unloading bay to another, or having the external monitor 602 assume control of the robotic arm to remove an item (e.g., box, carton, etc.) that is difficult to unload with autonomous routines. The external monitor 602 may include any of: a visual monitor, a keyboard, a joystick, an I/O port, a CD reader, a computer, a server, a handheld programming device, or any other device that may be used to perform any part of the above described embodiments.

The robotic material handling system 601 may include a human machine interface module 606 (or HMI module 606) that may be used to control and/or receive output information for the robot arm and conveyor system 615 and/or the base motion module 620. The HMI module 606 may be used to control (or may itself include) a joystick, a display, and a keypad that may be used for re-programming, over-riding the autonomous control of the machine, and driving the robotic material handling system 601 from point to point. Actuators 609 may be actuated individually or in any combination by the vision system 626 via the I/O module 608, and distance sensors 610 may be used to assist in guiding the robotic material handling system 601 into an unloaded area (e.g., a trailer). The I/O module 608 may connect the actuators 609 and distance sensors 610 to the PLC 618. The robotic arm and conveyor system 615 may include all components needed to move the arm and/or the conveyor, such as drives/engines and motion protocols or controls. The base motion module 620 may be the components for moving the entirety of the robotic material handling system 601. In other words, the base motion module 620 may be the components needed to steer the vehicle into and out of unloading areas.

The PLC 618 that may control the overall electromechanical movements of the robotic material handling system 601 or control exemplary functions, such as controlling the robotic arm or a conveyor system 615. For example, the PLC 618 may move the manipulator head of the robotic arm into position for obtaining items (e.g., boxes, cartons, etc.) from a wall of items. As another example, the PLC 618 may control the activation, speed, and direction of rotation of kick rollers, and/or various adjustments of a support mechanism configured to move a front-end shelf conveyor, such as front portion 142 of conveyor system 110 (FIG. 1). The PLC 618 and other electronic elements of the vision system 626 may mount in an electronics box (not shown) located under a conveyor, adjacent to a conveyor, or elsewhere on the robotic material handling system 601. The PLC 618 may operate all or part of the robotic material handling system 601 autonomously and may receive positional information from the distance sensors (not shown). The I/O module 608 may connect the actuators and the distance sensors 610 to the PLC 618.

The robotic material handling system 601 may include a vision system 626 that comprises sensor devices 630 (e.g., cameras, microphones, 3D sensors, etc.) and one or more computing device 628 (referred to as a personal computer or "PC" 628). The robotic material handling system 601 may use the sensor devices 630 and the one or more PC 628 of the vision system 626 to scan in front of the robotic material handling system 601 in real time or near real time. The forward scanning may be triggered by the PLC 618 in response to determining the robotic material handling system 601, such as a trigger sent in response to the robotic material handling system 601 being in position to begin detecting cartons in an unloading area. The forward scanning capabilities may be used for collision avoidance, sent to the human shape recognition (safety), sizing unloaded area (e.g., the truck or trailer), and for scanning the floor of the unloaded area for loose items (e.g., cartons, boxes, etc.). The 3D capabilities of the vision system 626 may also provide depth perception, edge recognition, and may create a 3D image of a wall of items (or carton pile). The vision system 626 may operate alone or in concert with the PLC 618 to recognize edges, shapes, and the near/far distances of articles in front of the robotic material handling system 601. For example, the edges and distances of each separate carton in the wall of items may be measured and calculated relative to the robotic material handling system 601, and vision system 626 may operate alone or in concert with the PLC 618 to may select specific cartons for removal.

In some embodiments, the vision system 626 may provide the PLC 618 with information such as: specific XYZ coordinate locations of cartons targeted for removal from the unloading area, and one or more movement paths for the robotic arm or the mobile body of the robotic material handling system 601 to travel. The PLC 618 and the vision system 626 may work independently or together such as an iterative move and visual check process for carton visualization, initial homing, and motion accuracy checks. The same process may be used during vehicle movement, or during carton removal as an accuracy check. In an embodiment, the vision system 626 detects the cartons and communicates that information to the PLC 618. The PLC 618 then uses the information to independently plan and execute carton retrieval. In another embodiment, the vision system 626 and the PLC 618 monitor the detected cartons over the movement path to evaluate any deviation from the movement path. Further, the visual check process may include, but is not limited to, performing image processing on data captured by the vision system 626 to determine a location, size, and/or orientation of any carton(s) targeted for removal from the unloading area. Alternatively, the PLC 618 may use the move and visualize process as a check to see whether one or more cartons have fallen from the carton pile or repositioned since the last visual check. While various computing devices and/or processors in FIG. 6, such as the PLC 618, vehicle controller module 622, and PC 628, have been described separately, in the various embodiments discussed in relation to FIG. 6 and all the other embodiments described herein, the described computing devices and/or processors may be combined and the operations described herein performed by separate computing devices and/or processors may be performed by less computing devices and/or processors, such as a single computing device or processor with different modules performing the operations described herein. As examples, different processors combined on a single circuit board may perform the operations described herein attributed to different computing devices and/or processors, a single processor running multiple threads/modules may perform operations described herein attributed to different computing devices and/or processors, etc.

An extendable conveyor system 632 can convey articles from the robotic material handling system 601 to other portions of a material handling system 600. As the robotic material handling system 601 advances towards or retreats from the unloading area, a vision device 634 on one of the extendable conveyor system 632 and robotic material handling system 601 can capture an image of a target 636 within the field of view of the vision device 634. Vision system 626 can perform image processing to detect changes in size, orientation and location of the target 636 within the field of view of the vision device 634. Device interfaces 638, 640 respectively of the extendable conveyor system 632 and the robotic material handling system 601 can convey vision information or movement commands. For example, PLC 618 can command an extension motion actuator 642 on the extendable conveyor system 632 to correspond to movements of the robotic material handling system 601 to keep the extendable conveyor system 632 and the robotic material handling system 601 in alignment and in proper spacing. In one embodiment, the device interfaces 638, 640 utilize a short range wireless communication protocol such as a Personal Access Network (PAN) protocol. Examples of PAN protocols which may be used in the various embodiments include Bluetooth®, IEEE 802.15.4, and Zigbee® wireless communication protocols and standards.

The rear mounted sensors 635, 2D ICDs 631, 3D ICD 633 and associated PC 628 can perform as an article detection system 650 to detect articles that have been placed onto robotic material handling system 601. In order to increase throughput or due to possible tumbling of poorly stacked articles of a carton pile, a number of articles can be placed on a front portion of the robotic material handling system 601 that cannot be simultaneously conveyed to the rear without possible jamming. However, the article detection system 650 avoids the need to individually singulate each article or carton to one side or the center of a robotic material handling before then conveying a train of singulated articles. The article detection system 650 can move more than one article at a time rearward to take advantage of an inherent descrambling capability of the robotic material handling system 601.

Figure 7:
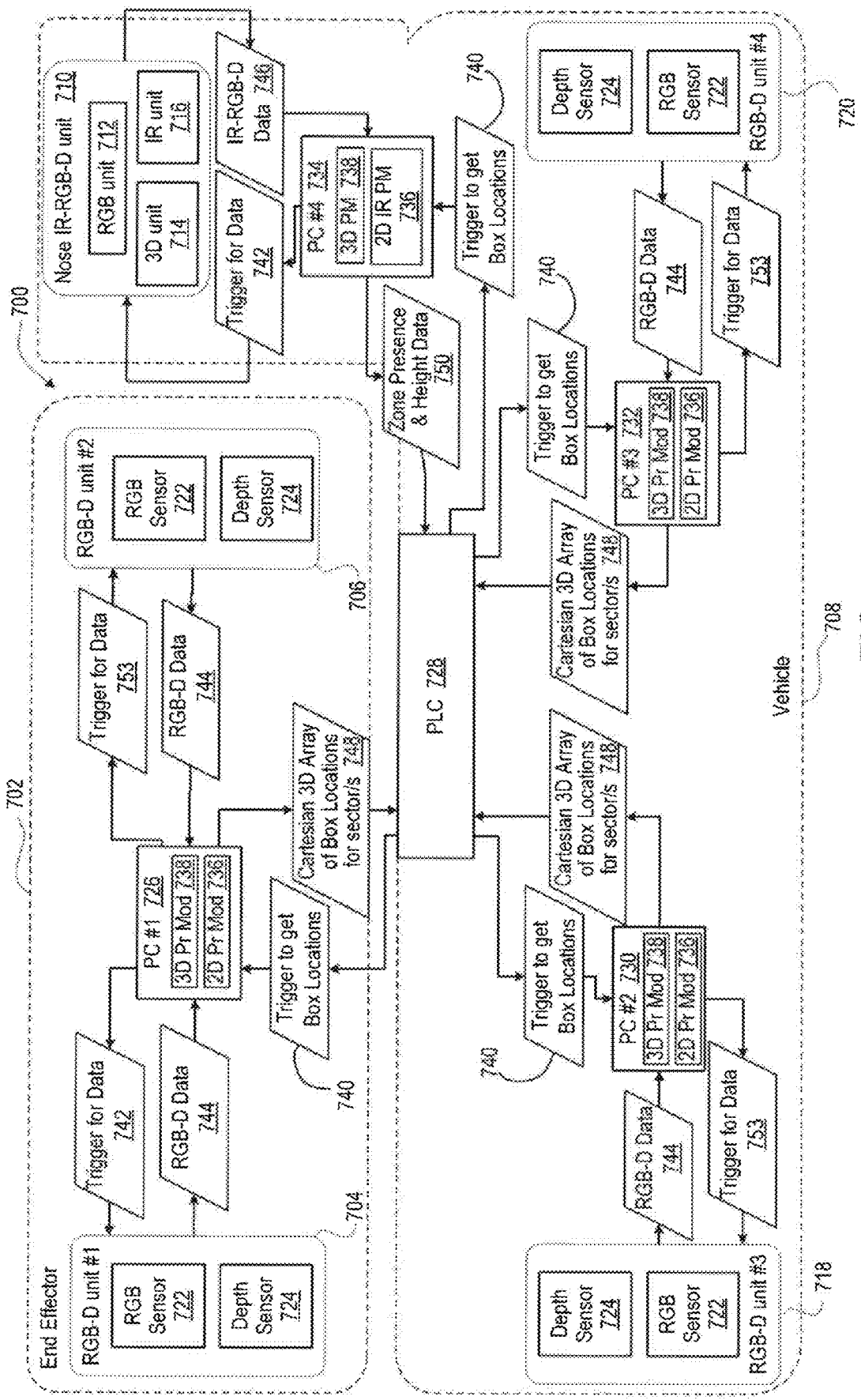
FIG. 7 illustrates a functional block diagram of a vision system of the robotic material handling system of FIG. 1, according to one or more embodiments.

FIG. 7 illustrates a data flow within an example vision system 700 of the robotic material handling system 100 (FIG. 1). An end effector 702 includes a first RGD-D unit 704 and a second RGD-D unit 706. A vehicle 708 includes a nose IR-RGB-D unit 710 positioned for conveyor screening and including an RGB unit 712, a 3D unit 714, and an IR unit 716. The vehicle 708 includes a third RGB-D unit 718 and a fourth RGB-D unit 720, each having an RGB sensor 722 and a depth sensor 724. A first PC 726 is in communication with the first and second RGD-D units 704, 706 and with a PLC 728 that performs automation control of the robotic material handling system 100 (FIG. 1). A second PC 730 is in communication with the third RGB-D unit 718 and PLC 728. A third PC 732 is in communication with the fourth RGB-D unit 720 and PLC 728. A fourth PC 734 is in communication with the fourth RGB-D unit 720 and PLC 728. The first, second, third and fourth PCs 726, 730, 732, 734 each include 2D process module 736 and a 3D process module 738. PLC 728 sends a trigger signal 740 to each of the first, second, third and fourth PCs 726, 730, 732, 734. Each of the first, second, third and fourth PCs 726, 730, 732, 734 in turn send a trigger signal 742 for data to respectively assigned first, second, third and fourth RGB-D units 704, 706, 718, 720 and nose IR-RGB-D unit 710. The first, second, third and fourth RGB-D units 704, 706, 718, 720 respond with RGB-D data 744. The nose IR-RGB-D unit 710 responds with IR-RGB-D data 746. The first, second, and third PCs 726, 730, 732 analyze RGB-D data 744 and provide a Cartesian 3D array 748 of box locations for assigned sectors or quadrants. Fourth PC 734 analyzes the IR-RGB-D data 746 and produces zone presence and height data 752. PLC 728 can consolidate this data or one of the first, second, third and fourth PCs 726, 730, 732, 734 can perform this role for the PLC 728.

In one aspect of the present disclosure, a vision system is used for product detection on conveyance systems using 3D sensors. A conveyor screening operation determines the presence of product on the conveyor to enable discharge speed improvements. Conveyor screening also provides product jam detection and "too tall" detection. A conveyor that has individually-controllable zones enables optimized singulation to reduce cycle time and to increase throughput of a robotic material handling system. An occupancy array generated by the conveyor screening application can be converted into sequenced vectors that sequence the product off of the conveyor in an expeditious fashion without creating a jam. 3D sensors, infrared sensors, depth sensors, etc., can be individually used or used in combination to achieve better product detection than realized by simple presence sensing devices such as photoeyes or single vantage point 2D Light Detection and Ranging (LIDAR) sensors that can fail to detect occluded products. By utilizing 3D area scanners mounted above the conveyor, the vision system can avoid or mitigate such occlusions. With product correctly identified by position and height on the conveyor, automation controls can sequence a series of individually-controlled singulating belts of the conveyor to speed the time to discharge products. In addition, knowing the heights of the products can be used to prevent downstream jamming without the need for additional sensors. For example, a threshold height can be set based upon a downstream height constraint of the material handling system. This functionality can be expanded with additional tracking to more accurately count the number of cases on the conveyor even when these cases are side by side, which is a common challenge faced in the distribution and parcel industry.

Sensor setup for conveyor screening for product detection provides more accurate information relating to items on the conveyor, which allows for smarter operation of conveyor system. Sensor system provides case height information so that it can serve as a too tall detection sensor, thus eliminating additional sensors, and provides an improvement over the traditional 2D LiDAR's which have limitations in providing detections only in 2D space. System that yields Improved Case counts.

Figure 8:
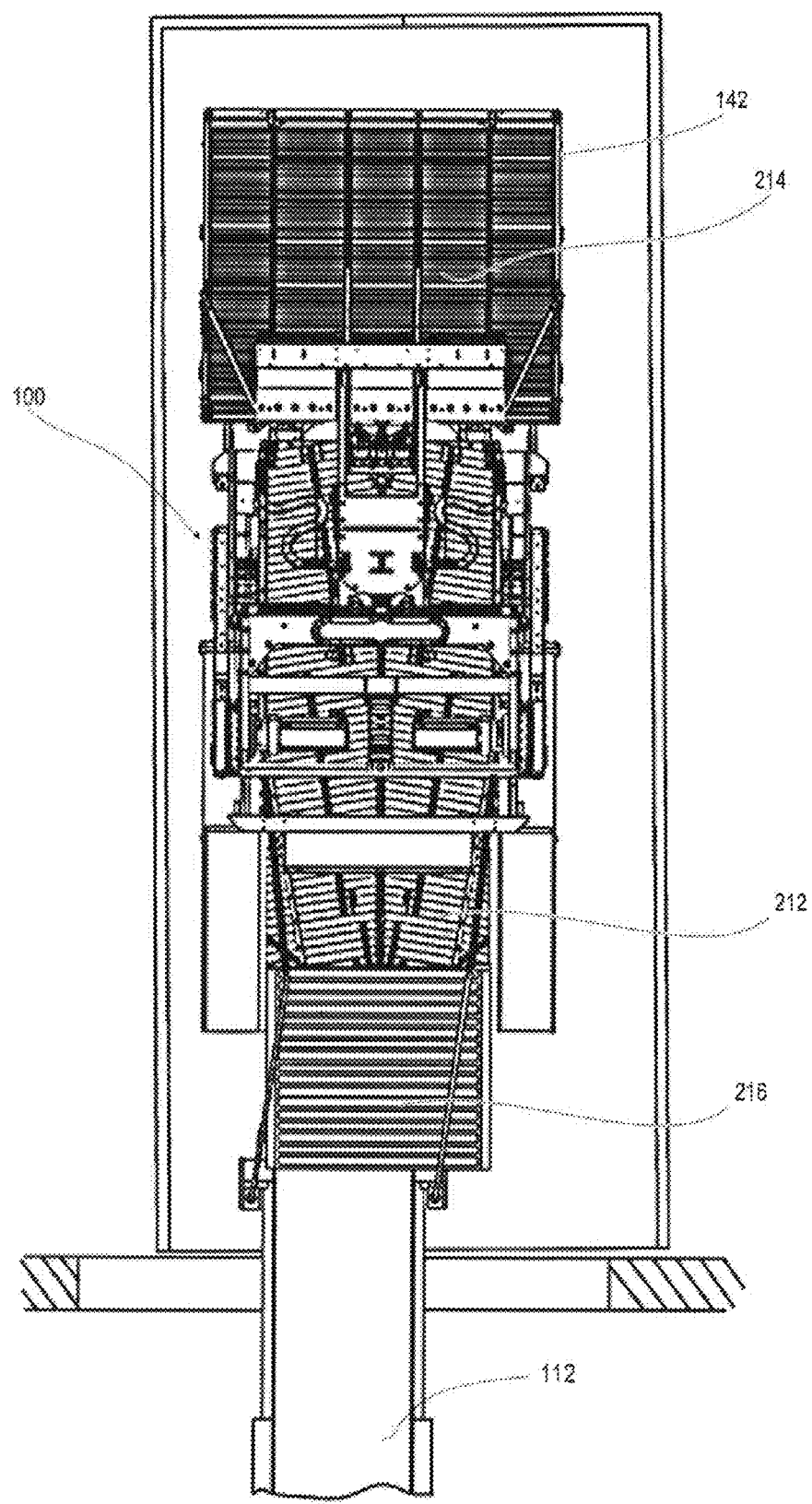
FIG. 8 illustrates a top view of the robotic material handling system of FIG. 1 that is laterally off center to an extendable conveyor, according to one or more embodiments.

FIG. 8 illustrates the robotic material handling system 100 having the front portion 142 of the conveyor system 110 that is capable of longitudinally separating articles (not shown) in an expeditious fashion without jamming or overwhelming the rearward conveyor 212. The rearward conveyor 212 is narrower than nose conveyor surface 214 and conveys articles via laterally-shifting transition conveyor 216 onto the extendable conveyor 112.

Figure 9:
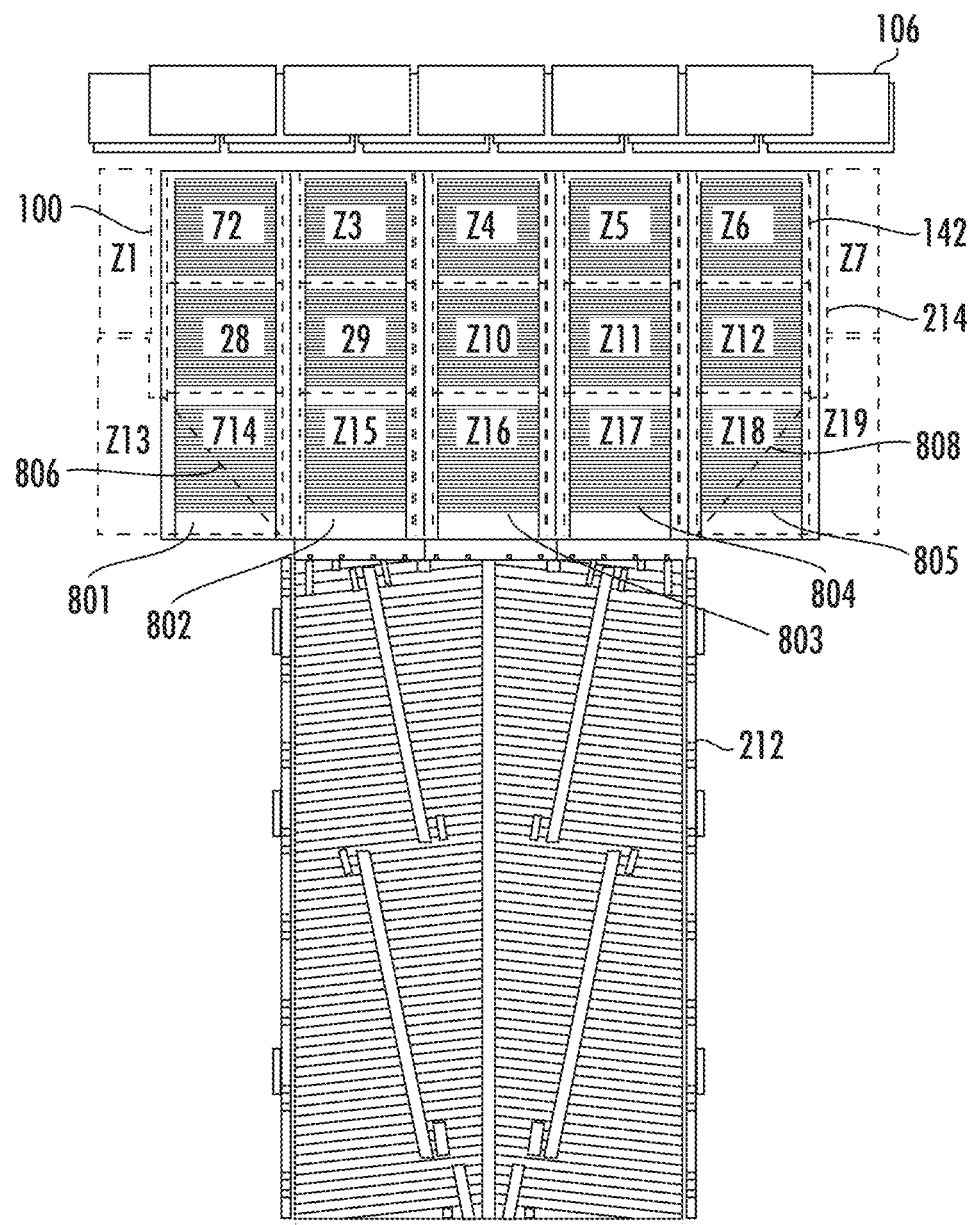
FIG. 9 illustrates a top view of a front nose conveyor surface annotated with scanning zones and a singulating rearward conveyor portion of the robotic material handling system of FIG. 1, according to one or more embodiments.

FIG. 9 illustrates the nose conveyor surface 214 can be placed proximate to a carton or carton pile 106. The nose conveyor surface 214 has five individually controllable and variable speed conveyors that are longitudinally aligned and laterally adjacent to one another. In particular from left to right, the nose conveyor surface 214 includes a first parallel conveyor 801, second parallel conveyor 802, third parallel conveyor 803, fourth parallel conveyor 804, fifth parallel conveyor 805. The rearward conveyor 212 is narrower than the nose conveyor surface 214. Thus, a left diverter 806 diverts articles from the first parallel conveyor 801 onto the second parallel conveyor 802 and a right diverter 808 diverts articles from the fifth parallel conveyor 805 onto the fourth parallel conveyor 804. The left diverter 806 and the right diverter 808 may be fixed or may be movable.

For selectively operating each parallel conveyor 801-805 at a speed appropriate to convey articles without jamming, the article detection system 650 (FIG. 6) scans the nose conveyor surface 214. In one embodiment, each parallel conveyor 801-805 is scanned in three zones: (i) distal zone, (ii) center zone, and (iii) proximal zone. In particular, the first parallel conveyor 801 (or "B1") has distal zone Z2, center zone Z8 and proximal zone Z14. The second parallel conveyor 802 (or "B2") has distal zone Z3, center zone Z9 and proximal zone Z15. The third parallel conveyor 803 (or "B3") has distal zone Z4, center zone Z10 and proximal zone Z16. The fourth parallel conveyor 804 (or "B4") has distal zone Z5, center zone Z11 and proximal zone Z17. The fifth parallel conveyor 805 (or "B5") has distal zone Z6, center zone Z12 and proximal zone Z18. For detecting articles inadvertently displaced laterally off of the nose conveyor surface, the article detection system 650 (FIG. 6) scans a left distal zone Z1 and a left proximal zone Z13 adjacent to the first parallel conveyor 801. The article detection system 650 (FIG. 6) also scans a right distal zone Z7 and a left proximal zone Z19 adjacent to the fifth parallel conveyor 805. For detecting an article from the scanned image, the article detection system 650 evaluates a 3D data of the scanned image against a 3D data of a trained profile of an empty nose conveyor surface.

Figure 10:
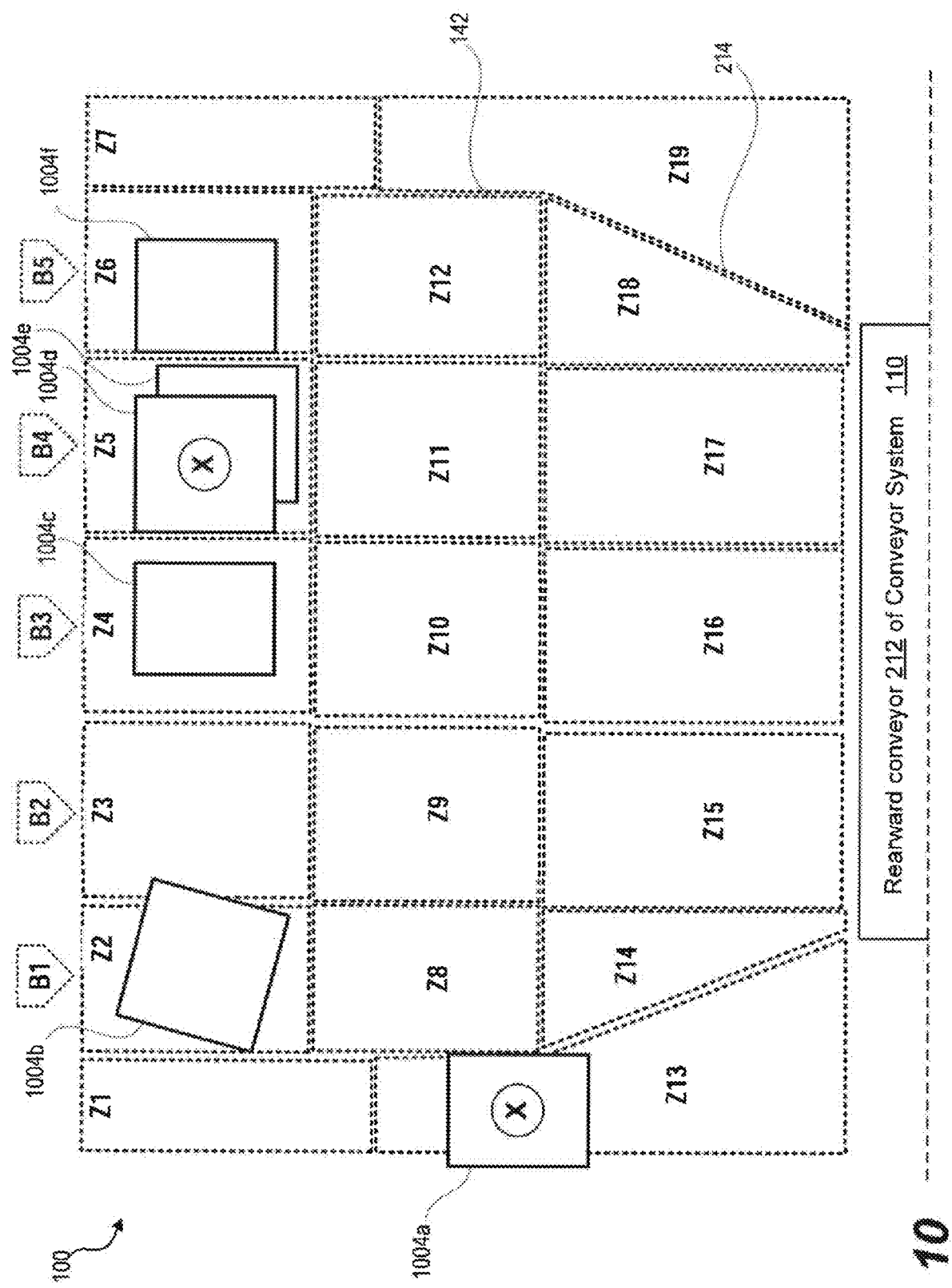
FIG. 10 illustrates a top diagrammatic view of the scanning zones of FIG. 9 that contain articles, according to one or more embodiments.

FIG. 10 illustrates a scenario 1000 wherein articles have been received or have moved to various zones on the nose conveyor surface 214 that warrant selective conveying to avoid jams or damaged product. Carton 1004a in zone Z13 can represent an article that has fallen off of the front portion 142 of the robotic material handling system 100. A failure indication can be used to prevent a movement of the robotic material handling system 100 that could damage the carton 1004a. An automatic, telecontrol, or manual response can be triggered retrieve the carton 1004a. Carton 1004b in zone Z2, which is the distal zone of B1, is the only carton on the left side of the nose conveyor surface 214. Recognizing this situation, the robotic material handling system 100 can expedite rearward conveyance at a first speed, which is a full conveying speed. Carton 1004c in distal zone Z4 of B3 is in the center of the nose conveyor surface 214. In an exemplary embodiment, the robotic material handling system 100 can begin conveying any article that may be on the center portion of the nose conveyor surface 214 while the nose conveyor surface 214 is homing. The nose conveyor surface 214 can be angled or lifted to be closer to the particular cartons that are being robotically moved. While robotic manipulator (not shown) is repositioning for another operation, the nose conveyor surface 214 can be moving back into alignment with the rearward conveyor 212. Alternatively, a transition plate (not shown) can guide cartons from the nose conveyor surface 214 onto the rearward conveyor 212. Stacked cartons 1004*d*, 1004*e* are in distal zone Z5 of B4. Article detection system 650 (FIG. 6) can recognize that this cartons 1004*d*, 1004*e* are too tall to be conveyed rearward without jamming or being damaged for insufficient clearance. A fault indication can prompt an automatic, telecontrol, or manual response to unstack the cartons 1004*d*, 1004*e* for example. In other instances, a tall article may require repositioning to achieve a lower height or manual carry. Carton 1004*f* in distal zone Z6 of B5 is a carton that should not be conveyed rearward at the same speed with any cartons in B4 due to possible jamming upon diversion from B5 onto B4.

Figure 11:
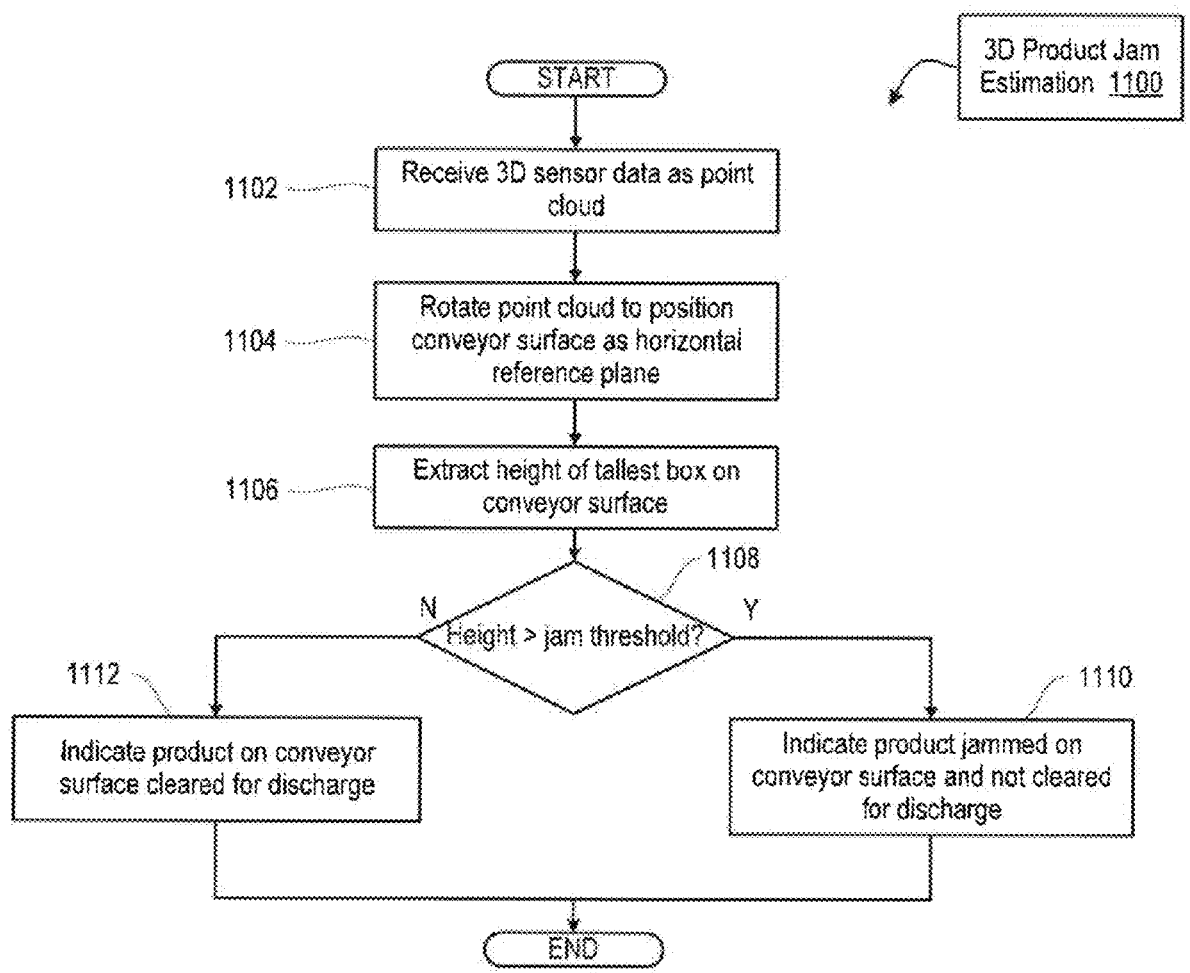
FIG. 11 illustrates a flow diagram of a method of performing product jam detection of the front singulating portion of the robotic material handling system using 3D sensor data, according to one or more embodiments.

FIG. 11 illustrates a method 1100 of performing product jam detection of the front singulating portion of the robotic material handling system using 3D sensor data, according to one or more embodiments. Method 1100 includes receiving 3D sensor data, from the nose IR-RGB-D unit 710 as shown in FIG. 7, as a point cloud (block 1102). Method 1100 includes rotating point cloud to position conveyance surface as horizontal reference plane (block 1104). Method 1100 includes extracting height of tallest box on conveyor surface (block 1106). In an embodiment, the orientation of the nose conveyor surface 214 is used to calculate a transformation for the 3D sensor data. That transformed 3D sensor data is then used in each data capture for the calculation of a detected object height. Thus, based on the detected object height of one or more boxes, the height of tallest box conveyor surface is extracted. Method 1100 includes determining whether the extracted height is greater than a jam height threshold (decision block 1108). In response to determining that the extracted height is greater than a jam height threshold in decision block 1108, method 1100 includes indicating a product jammed on conveyor surface and not cleared for discharge (block 1110). Then method 1100 ends. In response to determining that the extracted height is not greater than a jam height threshold in decision block 1108, method 1100 includes indicating product on conveyor surface is cleared for discharge (block 1112). Then method 1100 ends.

Figure 12:
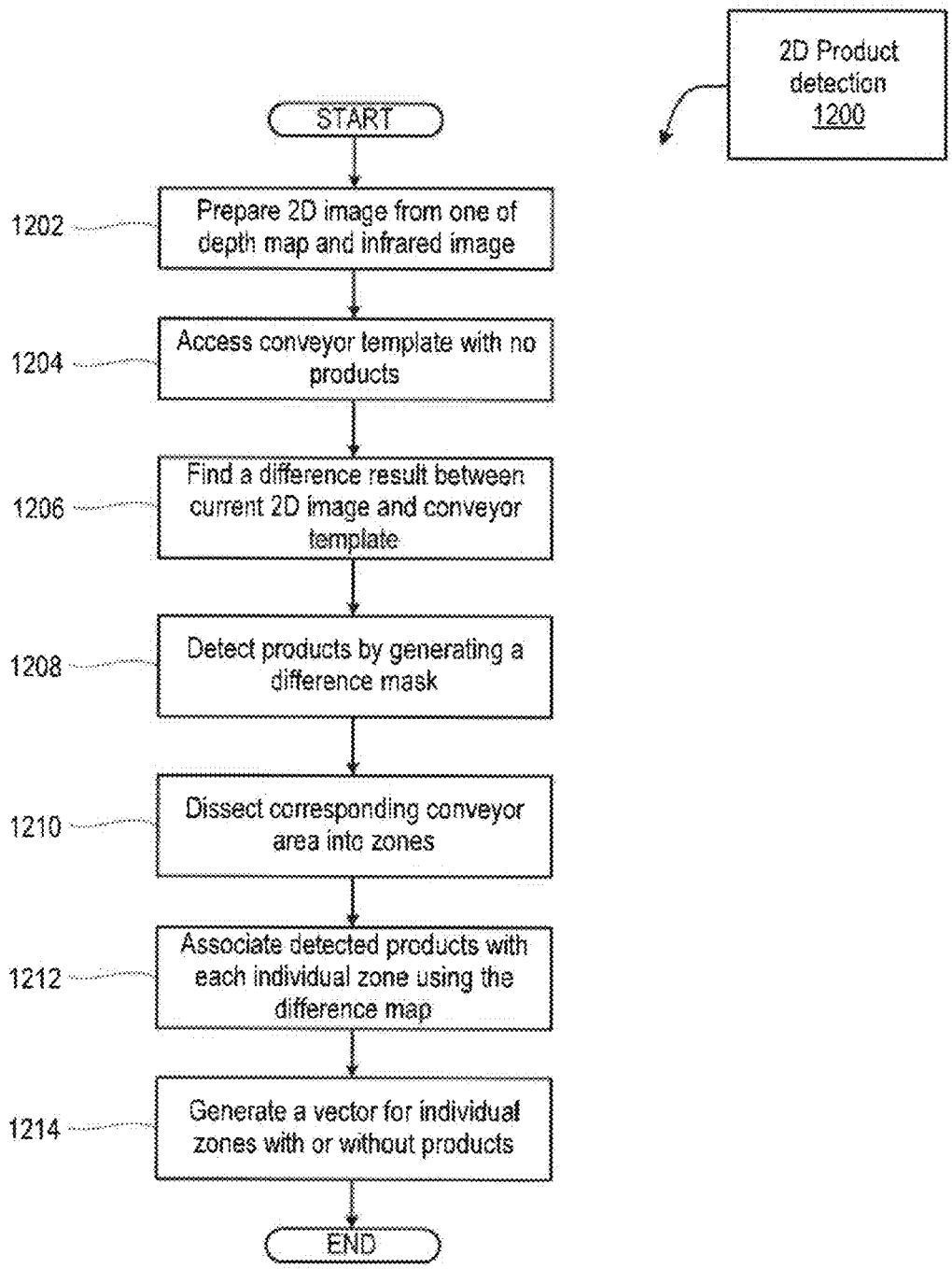
FIG. 12 illustrates a flow diagram of a method of detecting product in individual distal, center, and proximal zones of the front portion of the robotic material handling system using one of depth map and infrared imagery, according to one or more embodiments.

FIG. 12 illustrates a method 1200 of detecting product or articles in individual zones of the front portion of the robotic material handling system using one of depth map and infrared imagery. In one or more embodiments, method 1200 includes preparing 2D image from one of depth map and infrared image generated based on data received from the front 3D/2D sensors 176 as shown in FIGS. 2 and 4 (block 1202). Method 1200 includes accessing conveyor template with no products having 3D data of a trained profile of an empty nose conveyor surface 214 (block 1204). Method 1200 includes finding a difference result between current 2D image and conveyor template (block 1206). Method 1200 includes detecting products by generating a difference mask (block 1208). Method 1200 includes dissecting corresponding conveyor area of the 2D image into zones (block 1210). Method 1200 includes associating detected products with each individual zone using the difference mask (block 1212). Method 1200 includes generating a vector including an array of zones on the nose conveyor surface 214 indicating object detection for individual zones (block 1214). Method 1200 ends.

Figure 13:
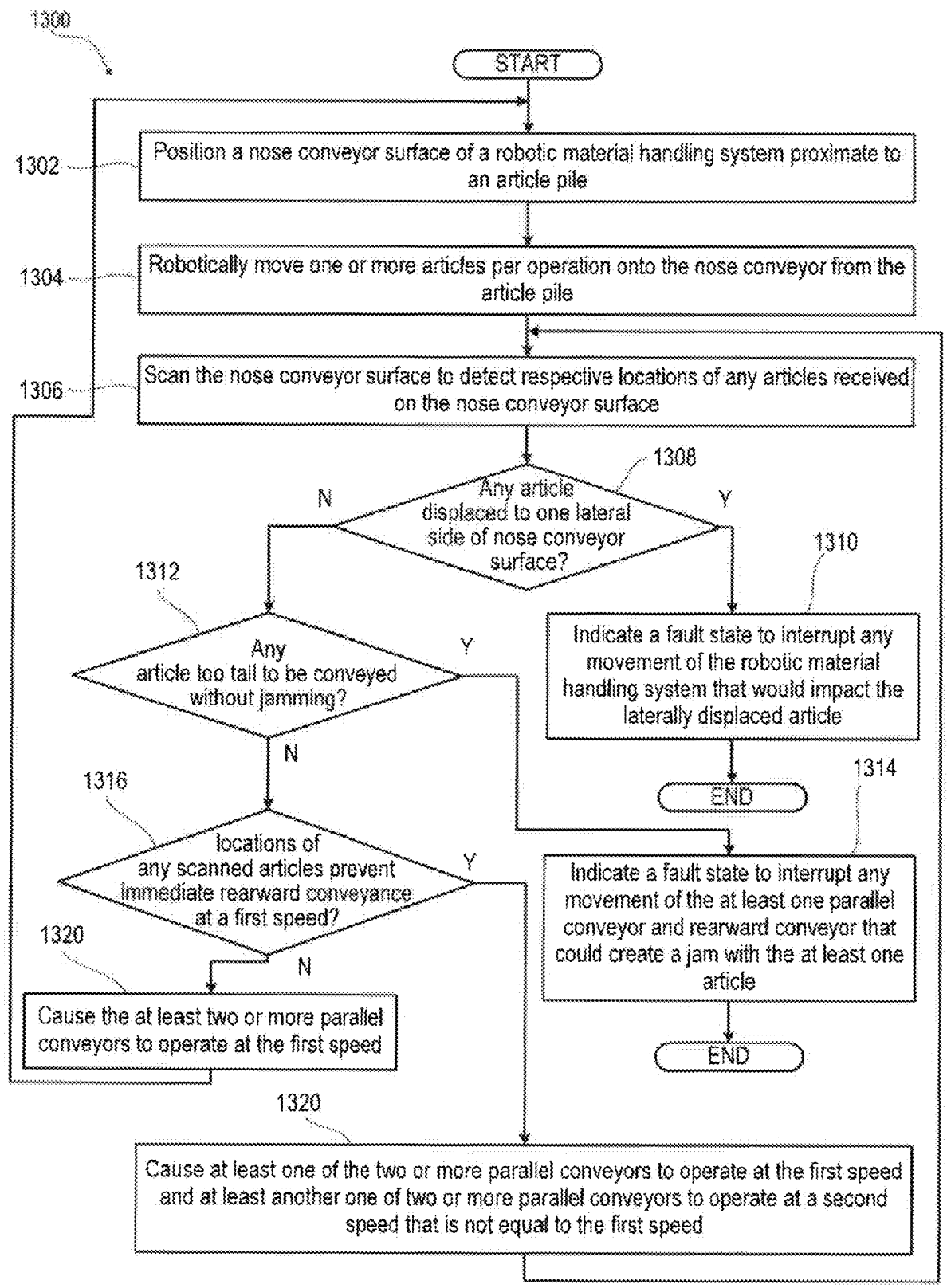
FIG. 13 illustrates a flow diagram of a method of conveying articles on a nose conveyor surface of a robotic material handling system, according to one or more embodiments.

FIG. 13 illustrates a method 1300 of conveying articles on a robotic material handling system. In one or more embodiments, the method 1300 includes positioning a nose conveyor surface of a robotic material handling system proximate to an article pile (block 1302). The nose conveyor surface has two or more parallel conveyors that are distal to and proximally feed a rearward conveyor that is laterally narrower than the nose conveyor surface. In one or more embodiments, one of the parallel conveyors is diverted onto another one of the at least two parallel conveyors, which should not be allowed to already have an article present at the diversion location. Method 1300 includes robotically moving one or more articles per operation onto the nose conveyor from the article pile (block 1304). Method 1300 includes scanning the nose conveyor surface to detect respective locations of any articles received on the nose conveyor surface (block 1306). Method 1300 includes determining whether any article is displaced to one lateral side of the nose conveyor surface (decision block 1308). In response to determining that any article is displaced to one lateral side of the nose conveyor surface in decision block 1308, method 1300 includes indicating a fault state to interrupt any movement of the robotic material handling system that would impact the displaced at least one article (block 1310). Then method 1300 ends. In response to determining that any article is not displaced to one lateral side of the nose conveyor surface in decision block 1308, method 1300 includes determining whether any article is too tall to be conveyed without jamming (decision block 1312). In response to determining that at least one article is too tall to be conveyed without jamming in decision block 1312, then method 1300 includes indicating a fault state to interrupt any movement of the at least one parallel conveyor and rearward conveyor that could create a jam with the at least one article (block 1314). Then method 1300 ends.

In response to determining that no article is too tall to be conveyed without jamming in decision block 1312, then method 1300 includes determining whether the respective locations of any scanned articles prevent immediate rearward conveyance by the two or more parallel conveyors at a first speed (decision block 1316). In response to determining that the respective locations of any scanned articles prevent immediate rearward conveyance in decision block 1312, method 1300 includes causing at least one of the two or more parallel conveyors to operate at the first speed and at least another one of two or more parallel conveyors to operate at a second speed that is not equal to the first speed (block 1318). Then method 1300 returns to block 1306 to monitor whether locations of articles warrant a change in operation of the nose conveyor surface. In an exemplary embodiment, articles closer to the center of the nose conveyor surface run faster than those to the outside when two articles such as cartons need to be singulated. However, in one or more embodiments, outside articles can be conveyed at a greater speed to singulate in front of inside articles. In an embodiment, the speed of the conveyance of articles is determined based on the detected product placement and analysis of product location, size, and/or volume.

In response to determining that the respective locations of any scanned articles do not prevent immediate rearward conveyance in decision block 1316, method 1300 includes causing the at least two or more parallel conveyors to operate at the first speed (block 1320). Then method 1300 returns to block 1302 to unload more articles. For example, one article can be present on the at least two parallel conveyors and thus any possible parallel conveyor that the article may contact can run at a fast speed to clear the nose conveyor surface as quickly as possible, without a possibility of two articles impeding each other at the rearward conveyor. For example, the rearward conveyor can have a capability of descrambling articles and creating a singulated train of articles if not fed with side-by-side articles.

Figure 14A:
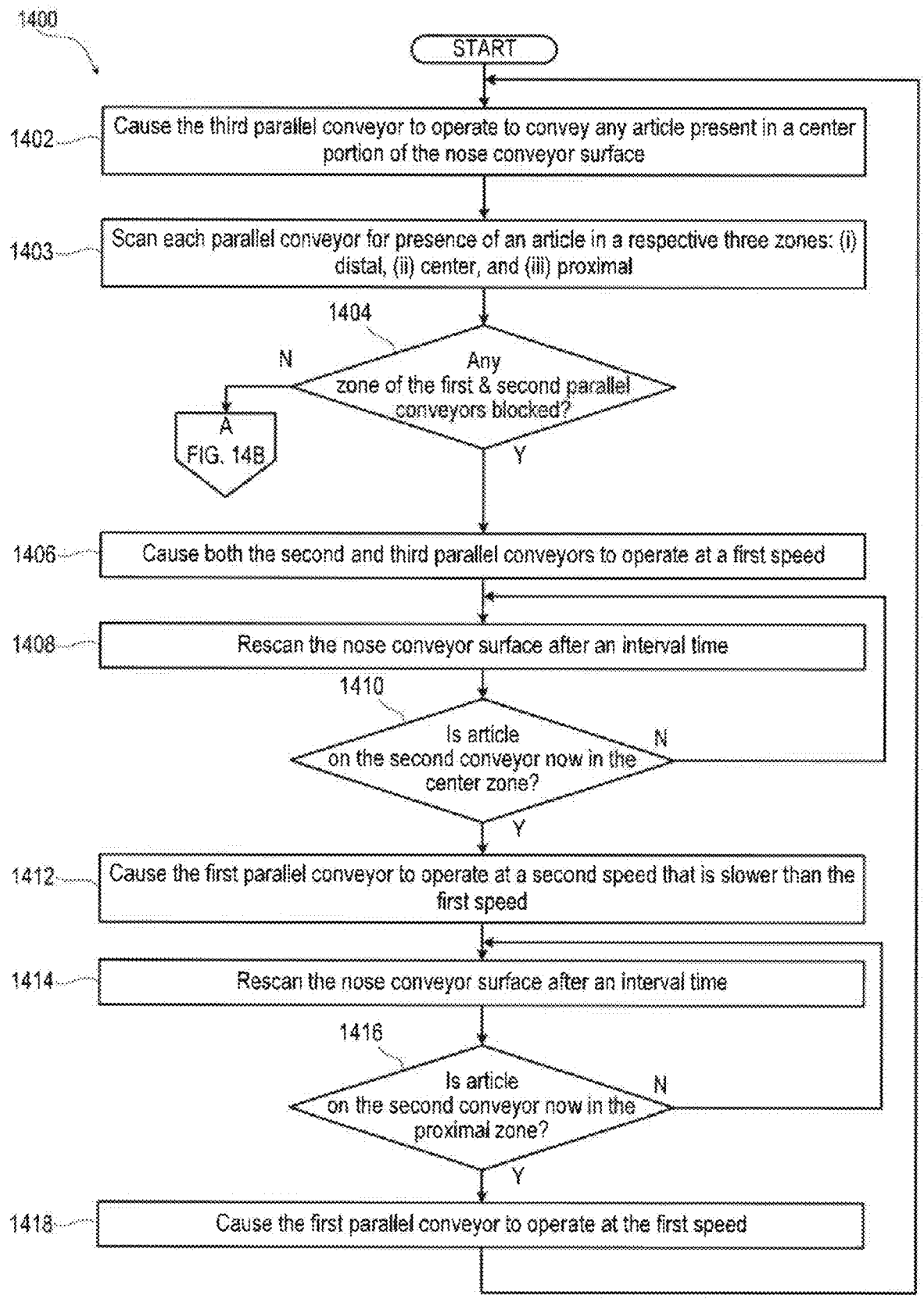
FIGS. 14A-14B illustrate a flow diagram of a method of conveying articles from a nose conveyor surface having five parallel conveyors onto a rearward conveyor that is aligned with the center three parallel conveyors.
Figure 14B:
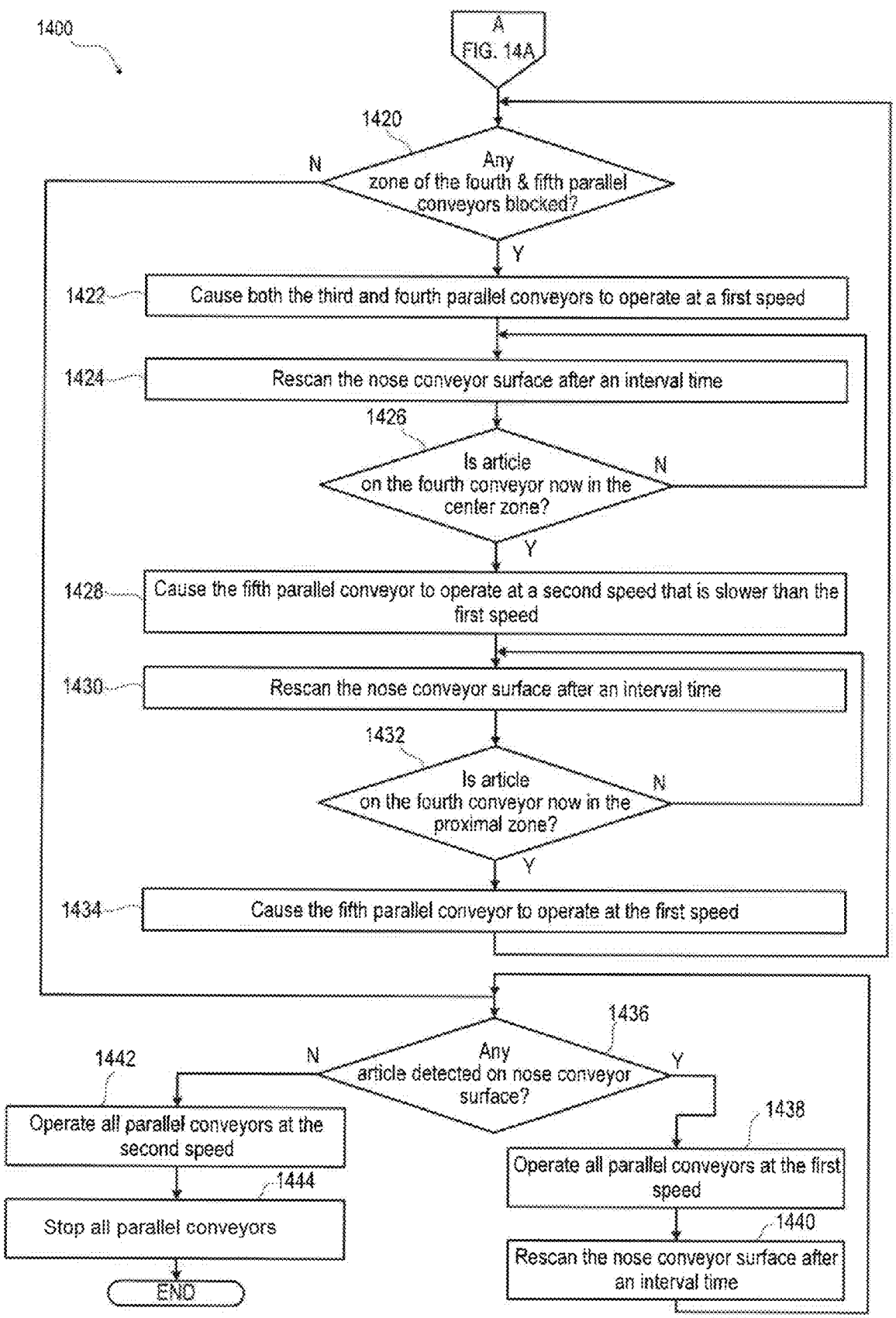

FIGS. 14A-14B illustrates an exemplary method for an embodiment of a robotic material handling system with a nose conveyor surface having first, second, third, fourth and fifth parallel conveyors. The first parallel conveyor diverts onto the second parallel conveyor and the fifth parallel conveyor diverts onto the fourth parallel conveyor. In one or more embodiments, method 1400 includes causing the third parallel conveyor to operate to convey any article present in a center portion of the nose conveyor surface (block 1402). As shown in FIG. 14A, method 1400 includes scanning each parallel conveyor for presence of an article in a respective three zones: (i) distal, (ii) center, and (iii) proximal (block 1403). Method 1400 includes determining whether one side of the nose conveyor surface is blocked in any zone of the first and second parallel conveyors, that is, at least one article is on that zone (decision block 1404). In response to determining that one side of the nose conveyor surface is blocked in any zone of the first and second parallel conveyors in decision block 1404, method 1400 includes causing both the second and third parallel conveyors to operate at a first speed (block 1406). First, fourth and fifth parallel conveyors remain stationary. Method 1400 includes rescanning the nose conveyor surface after an interval time (block 1408). Method 1400 includes determining whether at least a portion of the second parallel conveyor is empty adjacent to the first article on the second parallel conveyor by detecting that the article on the second conveyor is now in the center zone (decision block 1410). In response to determining that the article on the second conveyor has not yet moved from the distal zone to the center zone in decision block 1410, method 1400 returns to block 1408 to wait and to rescan. In response to determining that the article on the second conveyor has moved from the distal zone to the center zone in decision block 1410, method 1400 includes causing the first parallel conveyor to operate at a second speed that is slower than the first speed (block 1412). Method 1400 includes rescanning the nose conveyor surface after an interval time (block 1414). Method 1400 includes determining whether at least an additional portion of the second parallel conveyor is empty adjacent to the first article on the second parallel conveyor by detecting that the article on the second conveyor is now in the proximal zone (decision block 1416).

In response to determining that the article on the second conveyor has not yet moved from the center zone to the proximal zone in decision block 1416, method 1400 returns to block 1414 to wait and to rescan. In response to determining that the article on the second conveyor has moved at least from the center zone to the proximal zone in decision block 1416, method 1400 includes causing the first parallel conveyor to operate at the first speed (block 1418). Then method 1400 returns to block 1402 to verify that the first and second conveyors are empty before conveying articles on the fourth and fifth conveyors.

In response to determining that one side of the nose conveyor surface is not blocked in any zone of the first and second parallel conveyors in decision block 1404, then method 1400 includes determining whether the other side of the nose conveyor surface of the fourth and fifth parallel conveyors is blocked in any respective zone (decision block 1420), as shown in FIG. 14B. In response to determining that the other side of the nose conveyor surface of the fourth and fifth parallel conveyors is blocked in any respective zone in decision block 1420, method 1400 includes running both the third and fourth parallel conveyors at a first speed (block 1422). First, second, and fifth parallel conveyors remain stationary.

Method 1400 includes rescanning the nose conveyor surface after an interval time (block 1424). Method 1400 includes determining whether at least a portion of the fourth parallel conveyor is empty adjacent to the first article on the fifth parallel conveyor by detecting that the article on the second conveyor is now in the center zone (decision block 1426). In response to determining that the article on the fourth conveyor has not yet moved from the distal zone to the center zone in decision block 1426, method 1400 returns to block 1424 to wait and to rescan. In response to determining that the article on the fourth conveyor has moved from the distal zone to the center zone in decision block 1426, method 1400 includes causing the fifth parallel conveyor to operate at a second speed that is slower than the first speed (block 1428). Method 1400 includes rescanning the nose conveyor surface after an interval time (block 1430). Method 1400 includes determining whether at least an additional portion of the fourth parallel conveyor is empty adjacent to the first article on the fifth parallel conveyor by detecting that the article on the fourth conveyor is now in the proximal zone (decision block 1432). In response to determining that the article on the fourth conveyor has not yet moved at least from the center zone to the proximal zone in decision block 1432, method 1400 returns to block 1430 to wait and to rescan. In response to determining that the article on the fourth conveyor has moved at least from the center zone to the proximal zone in decision block 1432, method 1400 includes causing the fifth parallel conveyor to operate at the first speed (block 1434). Then method 1400 returns to block 1424 to verify that the fourth and fifth conveyors are empty.

In response to determining that the other side of the nose conveyor surface of the fourth and fifth parallel conveyors is not blocked in any respective zone in decision block 1420, method 1400 includes determining whether any articles are detected on the nose conveyor surface (decision block 1436). With both sides unblocked, articles may still remain at the center of the nose conveyor surface, specifically the third parallel conveyor. In response to determining that any articles are detected on the nose conveyor surface in decision block 1436, then all parallel conveyors are operated at the first speed (block 1438). Method 1400 includes rescanning the nose conveyor surface after an interval time (block 1440). Then method 1400 returns to decision block 1436 to see if the nose conveyor surface is cleared. In response to determining that no articles are detected on the nose conveyor surface in decision block 1436, then all parallel conveyors are operated at the second speed for a period of time (block 1442). Method 1400 includes stopping all parallel conveyors (block 1444). Then method 1400 ends.

Figure 15A:
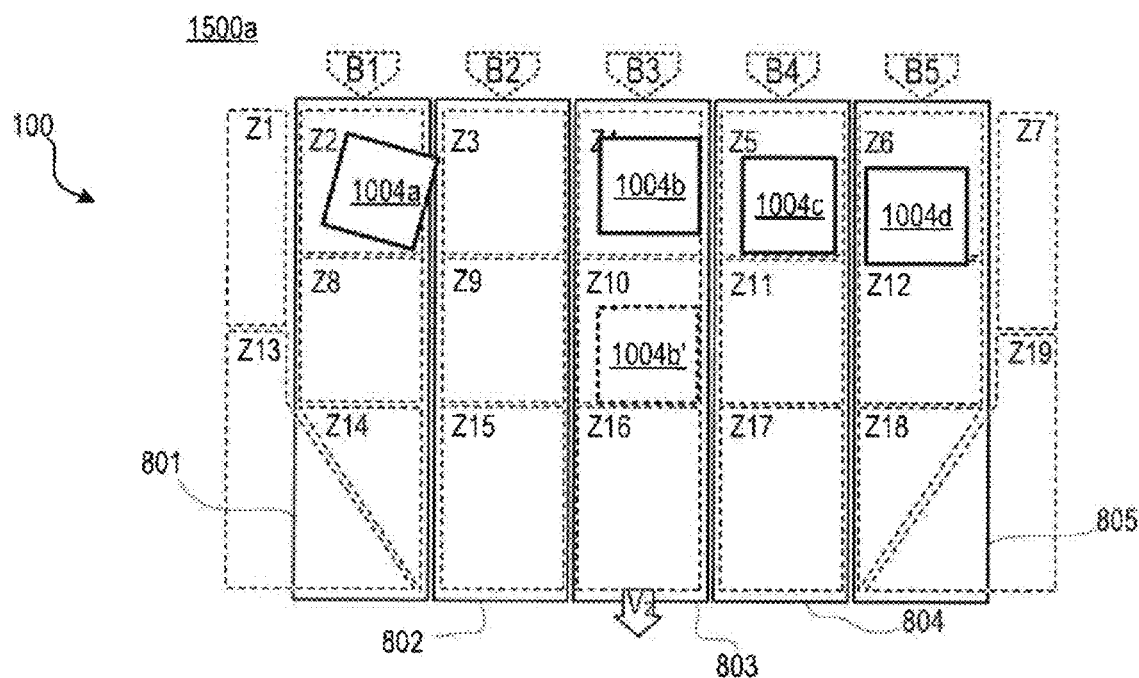
FIGS. 15A-15F illustrate top view diagrams of a sequence of conveying articles off of the nose conveyor surface of the robotic material handling system of FIG. 1, according to one or more embodiments.
Figure 15B:
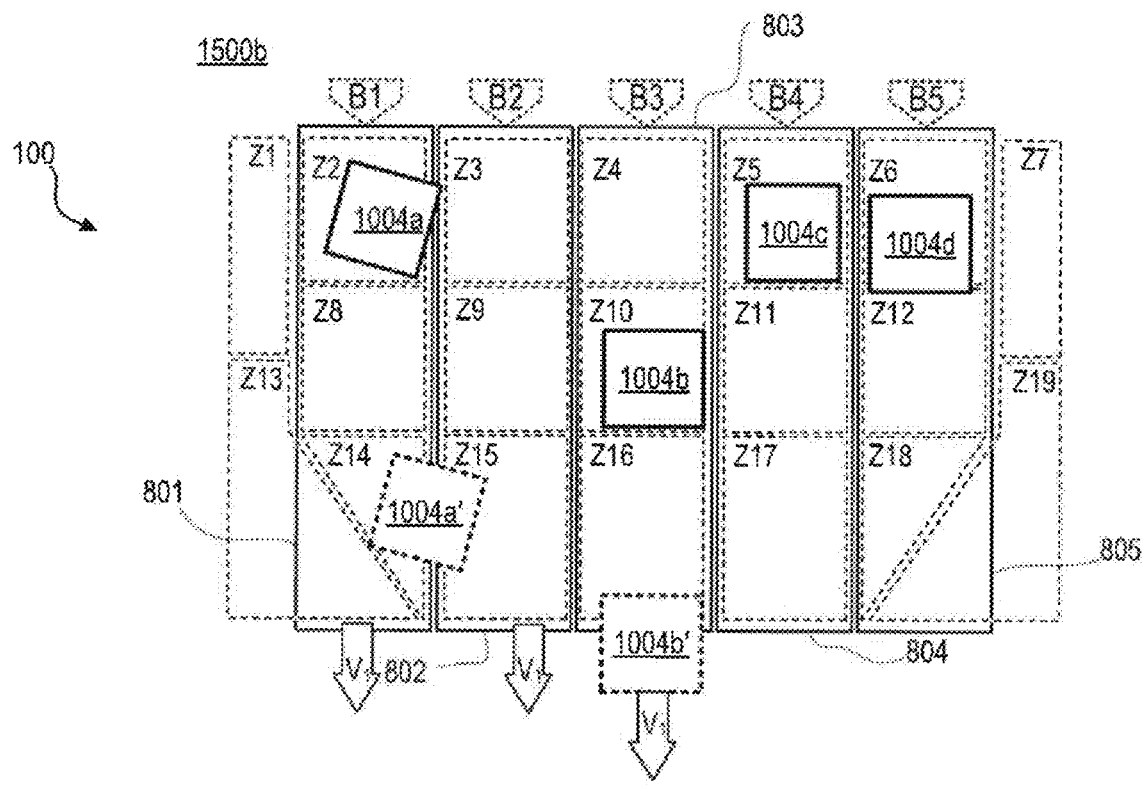

FIG. 15A illustrates an illustrative scenario 1500a of operation of the nose conveyor surface 214 with cartons 1004a-1004d initially in distal zones Z2 and Z4-Z6 respectively of the first parallel conveyor 801 ("B1"), third parallel conveyor 803 ("B3"), fourth parallel conveyor 804 ("B4"), and fifth parallel conveyor 805 ("B5"). During homing, B3 operates at a slow (second) speed "$V_2$" moving carton 1004b to carton 1004b' in center zone Z10. FIG. 15B illustrates a scenario 1500b after a period of time from scenario 1500a (FIG. 15A). The homed nose conveyor surface 214 is detected to have only one carton on the left side of either B1 and B2 and thus operates B1-B3 at the full (first) speed, conveying carton 1004a to proximal zone Z15 of B2 and conveying carton 1004b off of nose conveyor surface 214.

Figure 15C:
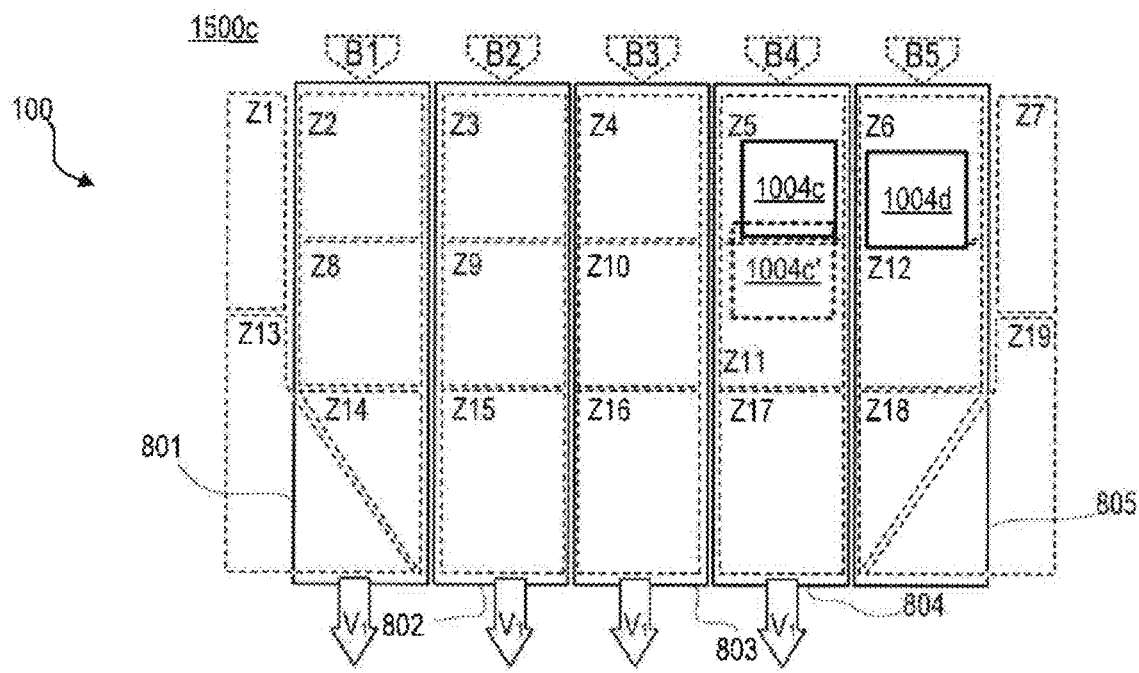
Figure 15D:
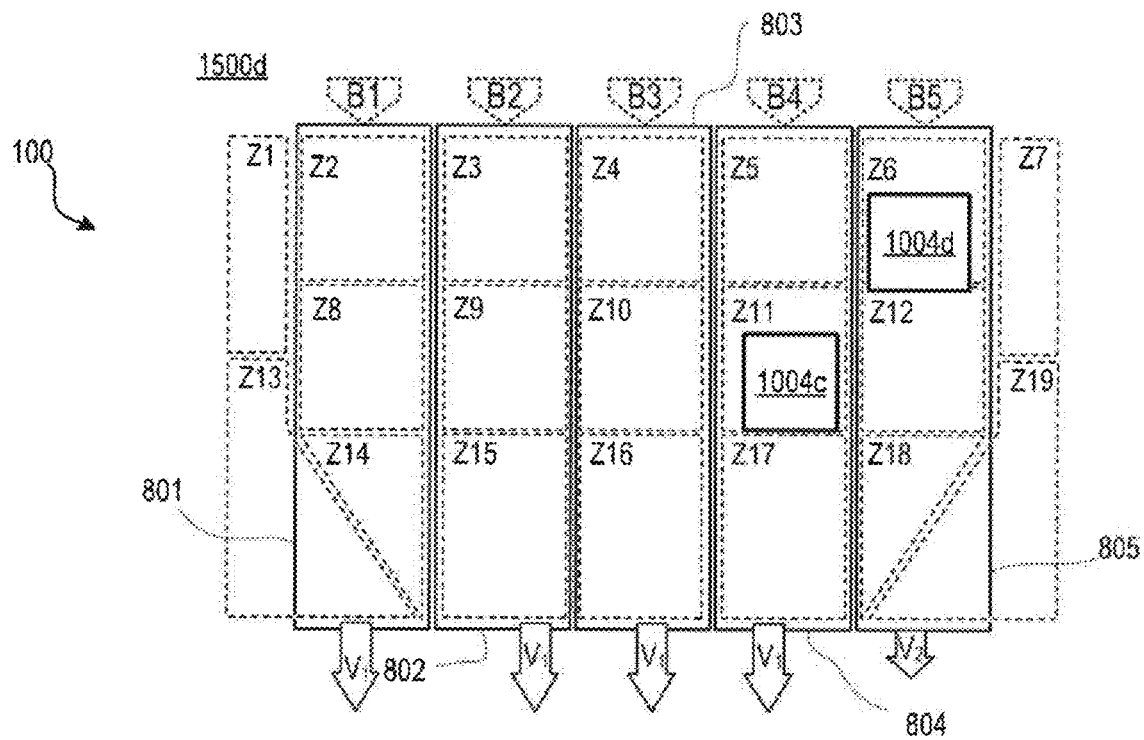
Figure 15E:
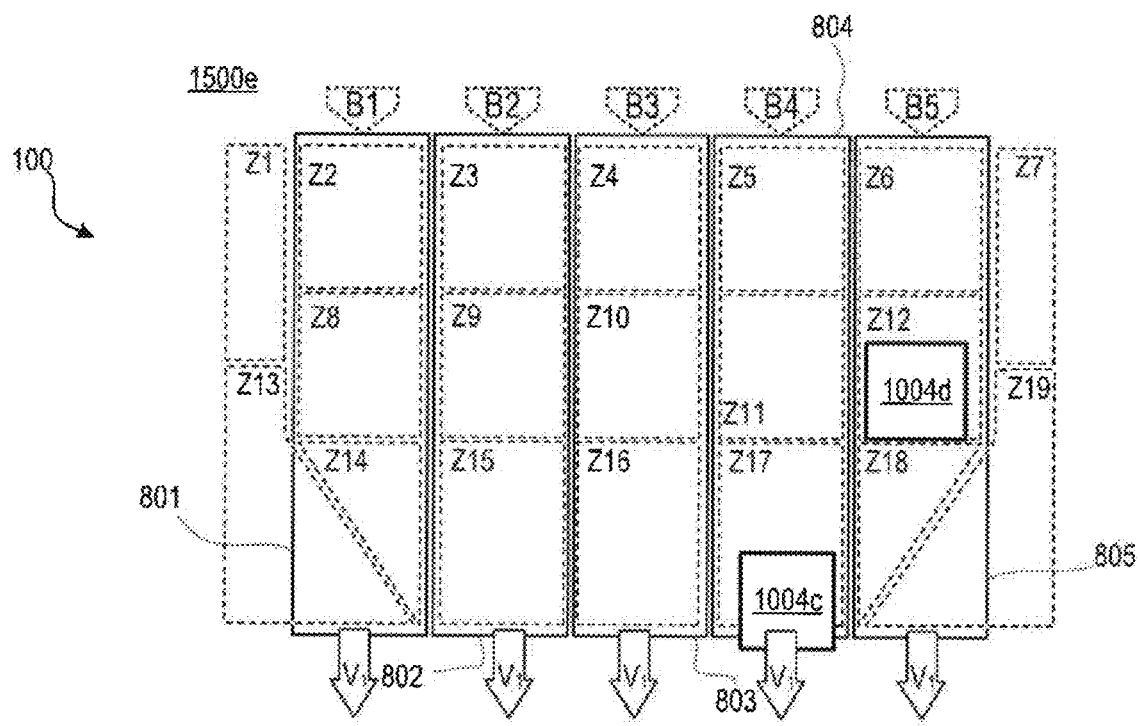
Figure 15F:
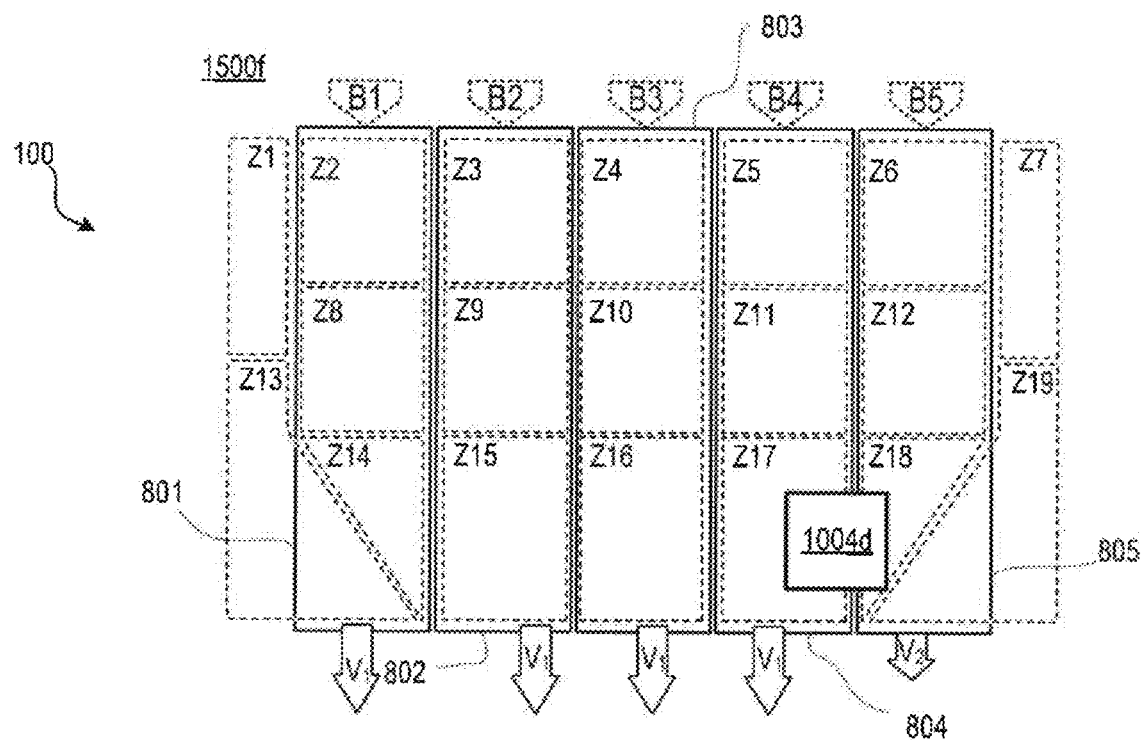

FIG. 15C illustrates a scenario 1500c after a period of time from scenario 1500b (FIG. 15B). The nose conveyor surface 214 is detected as having a blocked right side of both B4 and B5, preventing full speed conveying. In addition, the fourth and fifth parallel conveyors 804, 805 have been delayed in dispatching cartons 1004c and 1004d until the left side and center are cleared. FIG. 15D illustrates an illustrative scenario 1500d after a period of time from scenario 1500c (FIG. 15C). Carton 1004c has moved on B4 from distal zone Z5 to center zone Z11, enabling B5 to be operated at the second, slower speed "$V_2$". FIG. 15E illustrates an illustrative scenario 1500e after a period of time from scenario 1500d (FIG. 15D). Carton 1004c has moved on B4 from center zone Z11 to proximal zone Z17, enabling B5 to be operated at the first, higher speed "$V_1$". FIG. 15F illustrates an illustrative scenario 1500f after a period of time from scenario 1500e (FIG. 15E). Carton 1004d has moved on B5 from center zone Z12 to divert onto proximal zone Z17 of B4 in preparation for exiting the nose conveyor surface 214.

Figure 16:
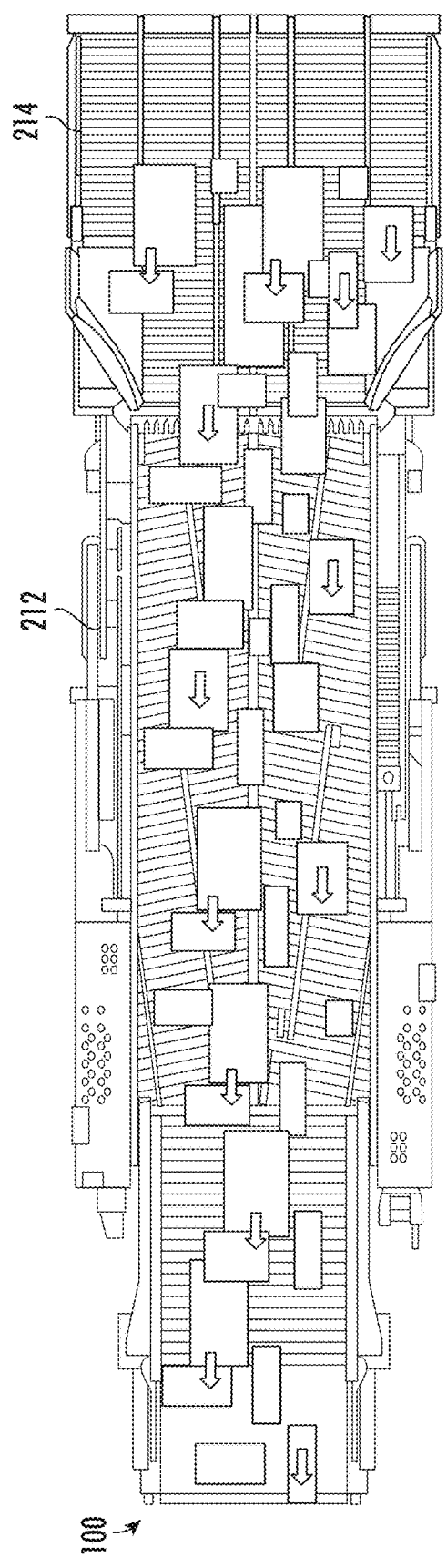
FIG. 16 illustrates a top view of conveying articles from the nose conveyor surface and the rearward conveyor of the robotic material handling system during normal, unjammed operation, according to one or more embodiments.

FIG. 16 illustrates a top view of conveying articles from the nose conveyor surface 214 and the rearward conveyor 212 of the robotic material handling system 100 during normal, unjammed operation, according to one or more embodiments of the present disclosure.

Figure 17A:
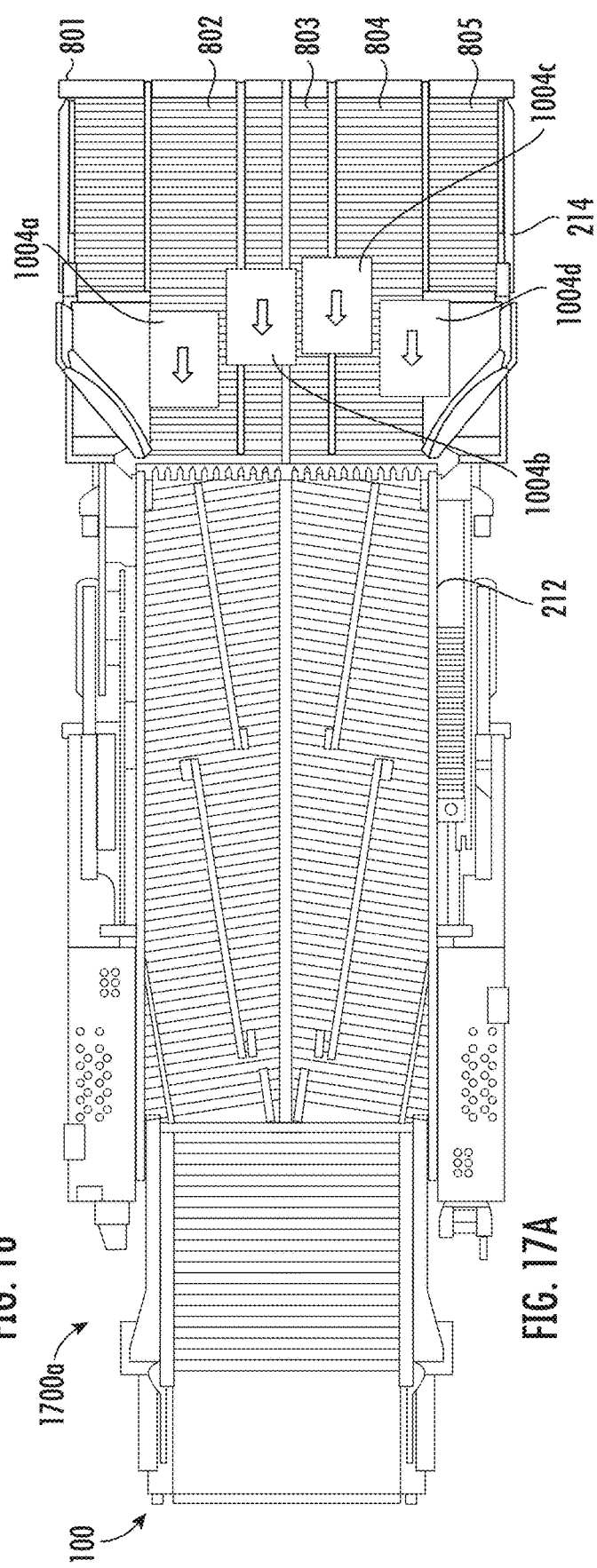
FIG. 17A illustrates a top view of the robotic material handling system having the nose conveyor surface with jammed articles, according to one or more embodiments.

FIG. 17A illustrates an illustrative scenario 1700a of operation of the robotic material handling system 100 having the nose conveyor surface 214 with jammed articles, according to one or more embodiments of the present disclosure. As shown in FIG. 17A, the nose conveyor surface 214 may be conveying cartons 1004a-1004d in a rearward direction towards the rearward conveyor 212. Carton 1004a may have diverted from the first parallel conveyor 801 ("B1") to the to the proximal zone (not shown) of the second parallel conveyor 802 ("B2"), carton 1004b may have travelled to the proximal zone (not shown) of the third parallel conveyor 803 ("B3"), carton 1004c may have travelled to the proximal zone (not shown) of the fourth parallel conveyor 804 ("B4"), and carton 1004d may have diverted from the fifth parallel conveyor 805 ("B5") to the proximal zone (not shown) of the fourth parallel conveyor 804 ("B4"). As shown in FIG. 17A, as the rearward conveyor 212 is narrower than the nose conveyor surface 214, cartons 1004a-1004d are jammed at the proximal end of the nose conveyor surface 214 and may not able to exit the nose conveyor surface 214.

Figure 17B:
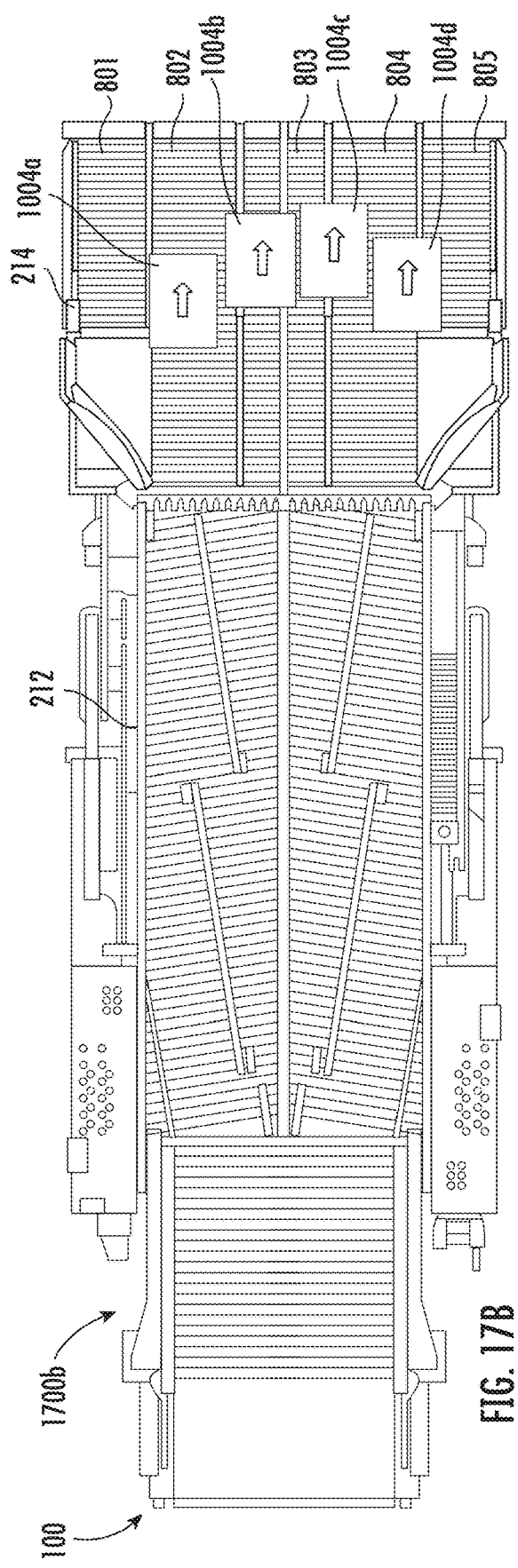
FIG. 17B illustrates a top view of the nose conveyor surface of the robotic material handling system having the jammed articles conveyed forward, according to one or more embodiments.

FIG. 17B illustrates an illustrative scenario 1700b of operation of the robotic material handling system 100 having the nose conveyor surface 214 after a period of time from scenario 1700a, according to one or more embodiments of the present disclosure. On detecting the jam at the nose conveyor surface 214, as shown in FIG. 17A, the nose conveyor surface 214 may change the direction of conveyance of the cartons 1004a-1004d from the rearward direction towards the rearward conveyor 212 to a forward direction away from the rearward conveyor 212, as shown in FIG. 17B. On operating the parallel conveyors 801-805 in a forward direction, the carton 1004a may move from the proximal zone to the center zone of the second parallel conveyor 802 ("B2"), carton 1004b may move from the proximal zone to center or distal zone of the third parallel conveyor 803 ("B3"), carton 1004c may move from the proximal zone to center or distal zone of the fourth parallel conveyor 804 ("B4"), and carton 1004d may move from the proximal zone to center zone of the fourth parallel conveyor 804 ("B4"), as shown.

Figure 17C:
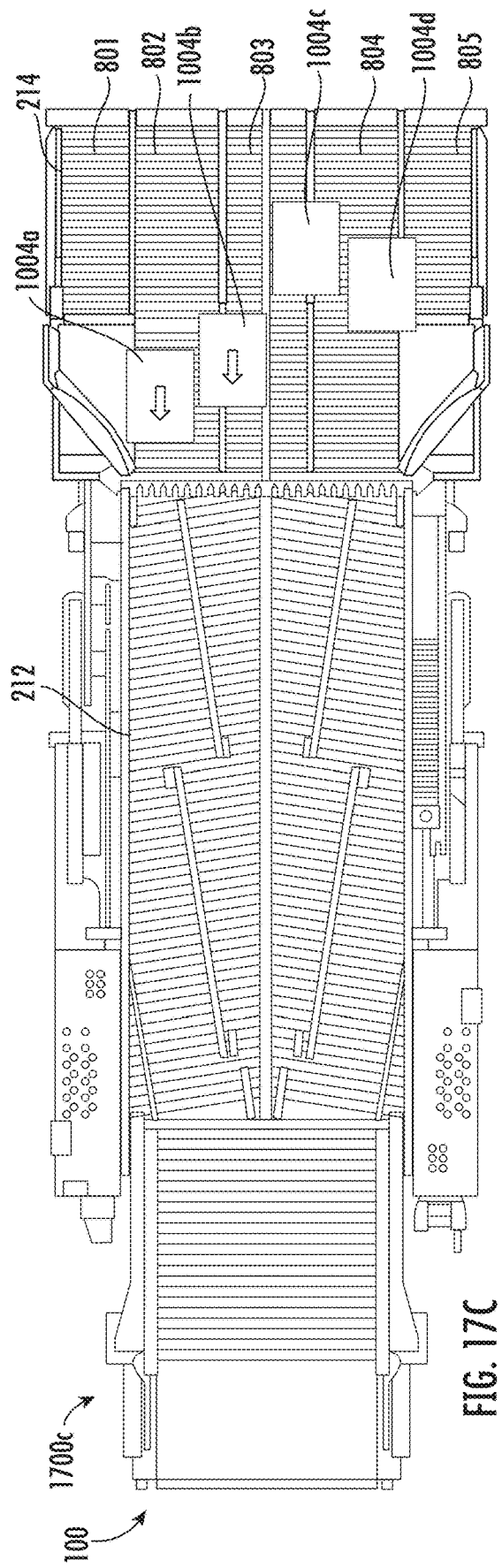
FIG. 17C illustrates a top view of the nose conveyor surface having a portion of the previously jammed articles conveyed rearward, according to one or more embodiments.

FIG. 17C illustrates an illustrative scenario 1700c of operation of the robotic material handling system 100 having the nose conveyor surface 214 after a period of time from scenario 1700b, according to one or more embodiments of the present disclosure. As shown in FIG. 17C, a portion of the previously jammed cartons may be conveyed rearward. Specifically, carton 1004a may be conveyed rearward from the center zone to the proximal zone of the second parallel conveyor 802 ("B2") based on the current location of carton 1004a. Similarly, carton 1004b may be conveyed rearward from the center or distal zone to the proximal zone of the third parallel conveyor 803 ("B3") based on the current location of carton 1004b. In an embodiment, the second parallel conveyor 802 ("B2") and the third parallel conveyor 803 ("B3") may convey the cartons 1004a-1004b at a first, higher speed, "$V_1$", as described above. In scenario 1700c, cartons 1004c-1004d may not be conveyed and may be kept stationary on the fourth parallel conveyor 804 ("B4") until left side of B4 is determined to be cleared, that is, the second parallel conveyor 802 ("B2") and/or the third parallel conveyor 803 ("B3"). In another embodiment, the fourth parallel conveyor 804 may convey the cartons 1004c-1004d from the center or distal zones to the proximal zone of B4 at a second, slower speed "$V_2$."

Figure 17D:
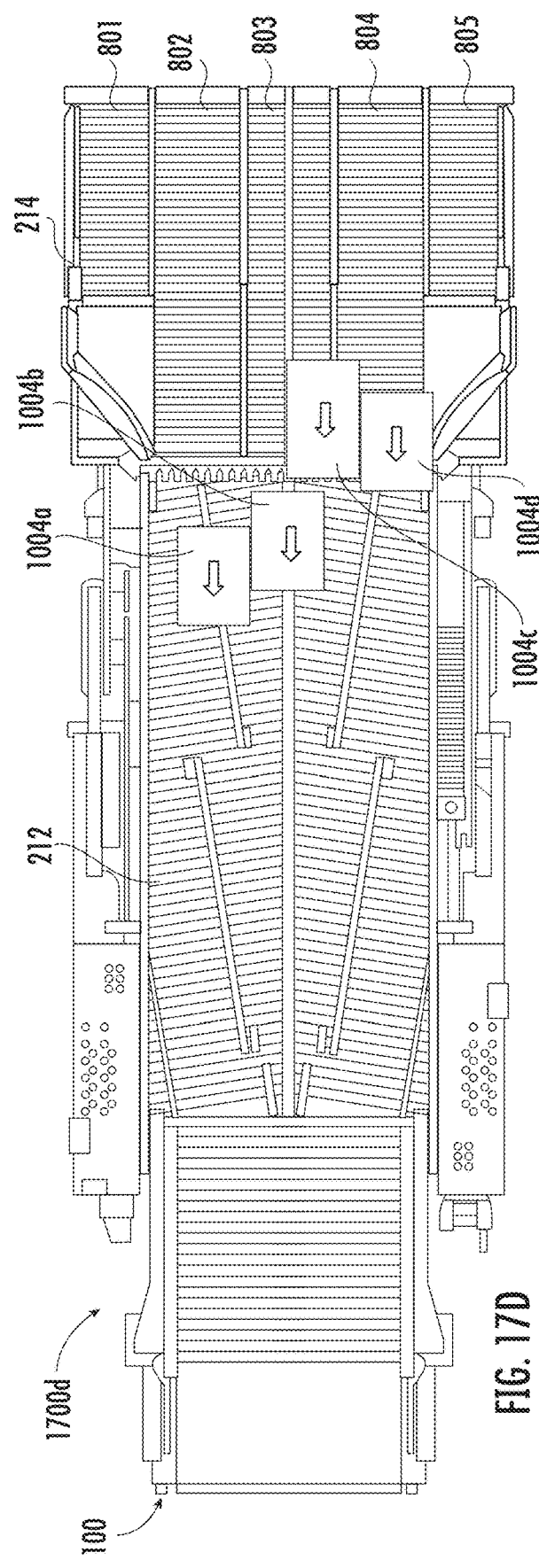
FIG. 17D illustrates a top view of the nose conveyor surface having a remaining portion of the previously jammed articles conveyed rearward, according to one or more embodiments.

FIG. 17D illustrates an illustrative scenario 1700d of operation of the robotic material handling system 100 having the nose conveyor surface 214 after a period of time from scenario 1700c, according to one or more embodiments of the present disclosure. As shown in FIG. 17D, remaining portion of the previously jammed cartons may be conveyed rearward towards the rearward conveyor 212. Specifically, carton 1004a may have moved from the second parallel conveyor 802 ("B2") to the rearward conveyor 212. Similarly, carton 1004b may have moved from the third parallel conveyor 803 ("B3") to the rearward conveyor 212. Once the left side of B4 is determined to be cleared, the fourth parallel conveyor 804 ("B4") may convey the cartons 1004c-1004d at a first, higher speed, "$V_1$" from the proximal zone of the B4 to the rearward conveyor 212. Thus, the jam on the nose conveyor surface 214 may be cleared by conveying the jammed articles in a forward direction and then conveying a portion of the jammed articles in the rearward direction followed by the remaining portion of the jammed articles.

Figure 18A:
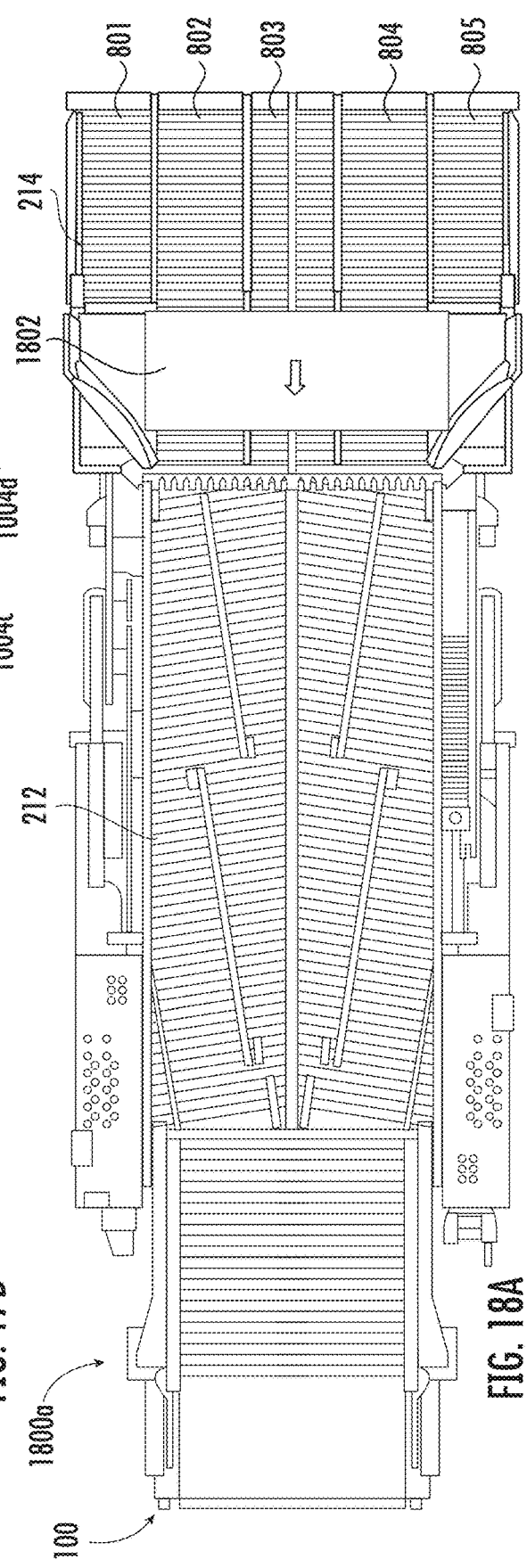
FIG. 18A illustrates a top view of the nose conveyor surface having a long article that is transversely aligned causing a jam, according to one or more embodiments.

FIG. 18A illustrates an illustrative scenario 1800a of operation of the nose conveyor surface 214 with a long article 1802 that is transversely aligned causing a jam, according to one or more embodiments of the present disclosure. As shown in FIG. 18A, the long article 1802 may have a length L1 that may be greater than the proximal end of the nose conveyor surface 214. Thus, the long article 1802 may be jammed at the proximal zone of the second parallel conveyor 802 ("B2"), the third parallel conveyor 803 ("B3"), and the fourth parallel conveyor 804 ("B4") of the nose conveyor surface 214, as shown. FIG. 18B illustrates a scenario 1800b of operation of the robotic material handling system 100 having the nose conveyor surface 214 after a period of time from scenario 1800a, according to one or more embodiments of the present disclosure. On detecting the jam on the nose conveyor surface 214 based on data received from the nose IR-RGB-D unit 710 as shown in FIG. 7, due to the transversely aligned long article 1802, one or more parallel conveyors having a portion of the long article 1802 may be moved in a forward direction to rotate the long article 1802 at least partially into a longitudinal alignment, according to one or more embodiments of the present disclosure. If the operation fails, the one or more parallel conveyors having a portion of the long article 1802 may be moved in the opposite direction to rotate the long article

Figure 18D:
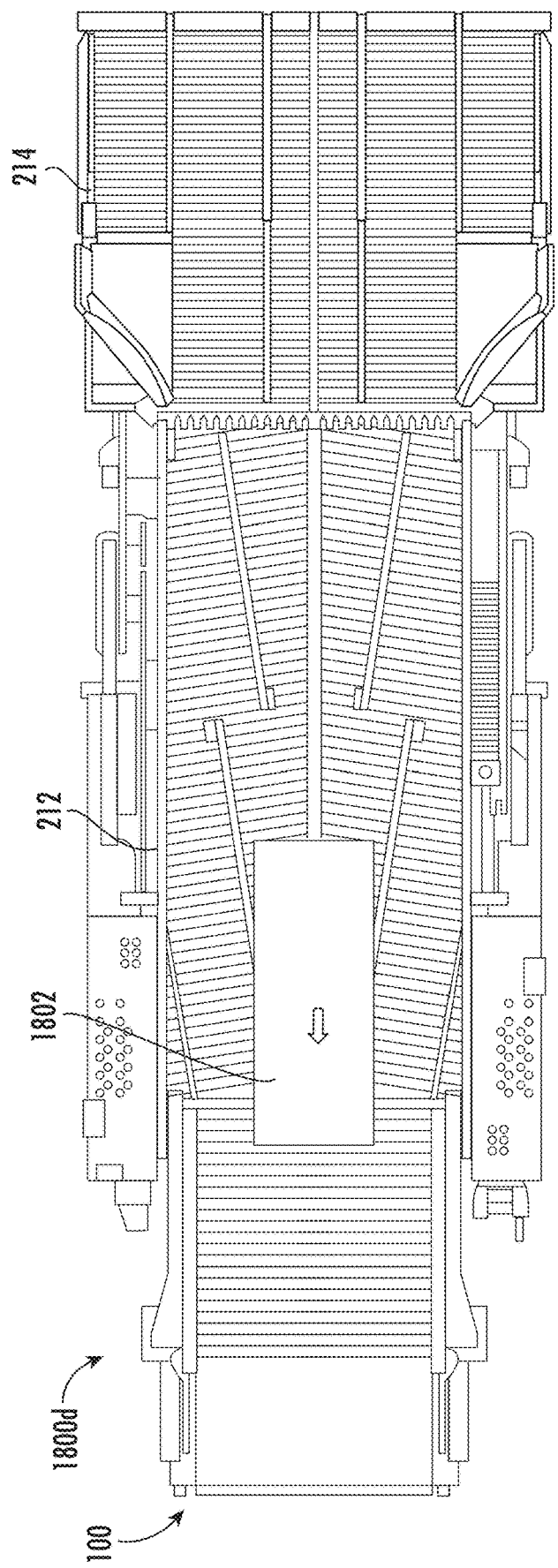
FIG. 18D illustrates a top view of the nose conveyor surface rearwardly conveying the partially longitudinally aligned article on the rearward conveyor, according to one or more embodiments.

1802. In an embodiment, the one or more parallel conveyors may be selected based on the area of contact with the article. For example, the parallel conveyors that have most the portion of the article in contact, may be moved in a forward and/or backward direction. In an embodiment, the third parallel conveyor 803 ("B3") and the fourth parallel conveyor 804 ("B4") having contact with at least a portion of the long article 1802, may convey the long article 1802 in a forward direction away from the rearward conveyor 212, as shown in FIG. 18B. Further, the second parallel conveyor 802 ("B2") may continue to convey the long article 1802 in the rearward direction towards the rearward conveyor 212. Thus, the long article 1802 may be rotated from the transverse alignment to a partially longitudinal alignment. FIG. 18C illustrates a scenario 1800c of operation of the robotic material handling system 100 having the nose conveyor surface 214 after a period of time from scenario 1800b, according to one or more embodiments of the present disclosure. In an embodiment, on detecting that the at least partially aligned long article 1802 may be conveyed from the nose conveyor surface 214 to the rearward conveyor 212, the third parallel conveyor 803 ("B3") and the fourth parallel conveyor 804 ("B4") may change the direction of the conveyance of the long article 1802 from a forward direction to the rearward direction. FIG. 18D illustrates a scenario 1800d of operation of the robotic material handling system 100 having the nose conveyor surface 214 after a period of time from scenario 1800c, according to one or more embodiments of the present disclosure. As shown in FIG. 18D, the long article 1802 may be rearwardly conveyed on the rearward conveyor 212. Thus, the long article 1802 may be rotated, re-aligned, unjammed, and conveyed from the nose conveyor surface 214 to the rearward conveyor 212.

Figure 19A:
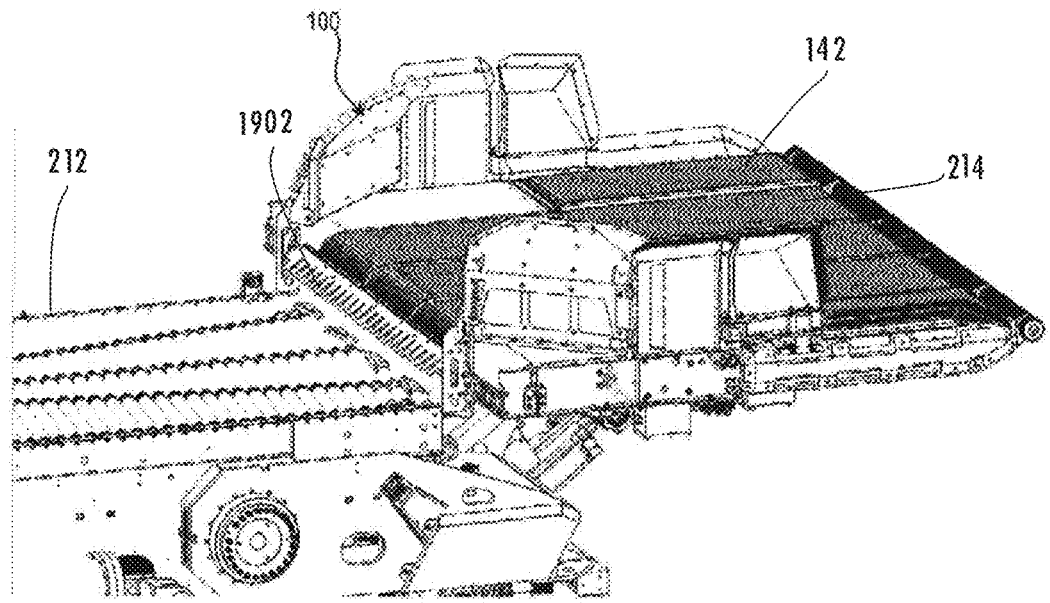
FIG. 19A illustrates a perspective view of the nose conveyor surface in a raised position, according to one or more embodiments.

FIG. 19A illustrates the robotic material handling system 100 having the front portion 142 of the conveyor system 110 that is capable of longitudinally separating articles (not shown) in an expeditious fashion without jamming or overwhelming the rearward conveyor 212. The front portion 142 includes the nose conveyor surface 214 for conveying articles to the rearward conveyor 212. The rearward conveyor 212 may be narrower than the nose conveyor surface 214, as shown in FIG. 19A. The front portion 142 of the conveyor system 110 may further include the left diverter 806 and the right diverter 808, as shown previously in FIG. 9. The left diverter 806 and the right diverter 808 may extending vertically on each side of the nose conveyor surface 214. The left diverter 806 may divert articles from a center zone of the first parallel conveyor 801 to a proximal zone of the second parallel conveyor 802. The right diverter 808 may divert articles from a center zone of the fifth parallel conveyor 805 to a proximal zone of the fourth parallel conveyor 804.

Figure 19B:
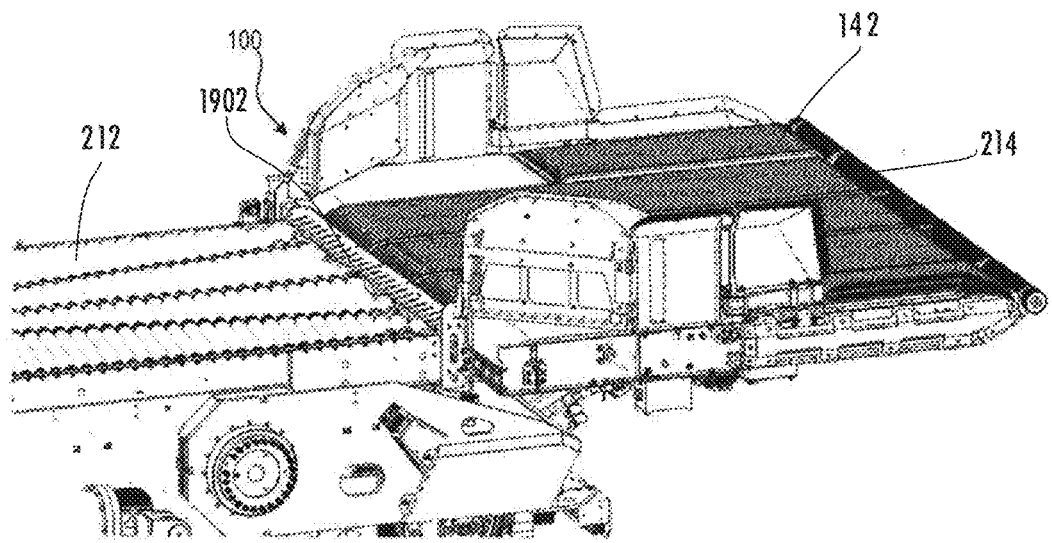
FIG. 19B illustrates a perspective view of the nose conveyor surface in a homed position aligned with the rearward conveyor, according to one or more embodiments.

The front portion 142 of the conveyor system 110 may further have a transition plate 1902, as shown in FIG. 19A. In an embodiment, the transition plate 1902 may be hingedly attached to the proximal end of the nose conveyor surface 214 at one end. The other end of the transition plate 1902 may reside over the rearward conveyor 212 when the nose conveyor surface 214 is homed. In another embodiment, one end of the transition plate 1902 may be fixedly attached at an angle to the proximal end of the nose conveyor surface 214, and the other end of the transition plate 1902 may reside over the rearward conveyor 212 when the nose conveyor surface 214 is homed. In an embodiment, the transition plate 1902 may not reside over and/or contact the rearward conveyor 212. The transition plate 1902 may provide a transition platform for articles being conveyed from the nose conveyor surface 214 to the rearward conveyor 212, and/or vice versa. The transition plate 1902 may prevent smaller articles from falling through a gap between the nose conveyor surface 214 to the rearward conveyor 212, and may also prevent any damage to heavy or fragile articles by allowing them to slide over the transition plate 1902 towards the rearward conveyor 212, instead of an abrupt transition from the nose conveyor surface 214 to the rearward conveyor 212. FIG. 19A, illustrates the nose conveyor surface 214 in a raised position, such that the transition plate 1902 creates an inclined transition platform between the nose conveyor surface 214 and the rearward conveyor 212. FIG. 19B illustrates the nose conveyor surface 214 in a homed position aligned with the rearward conveyor 212, according to one or more embodiments of the present disclosure. As shown in FIG. 19B, the transition plate 1902 may act as a transition platform between the nose conveyor surface 214 and the rearward conveyor 212. In an embodiment, the angle of incline (if any) of the transition plate 1902 when the nose conveyor surface 214 is in the homed position is lesser than an angle of incline when the nose conveyor surface 214 may be in a raised position, as in FIG. 19A.

Figure 20A:
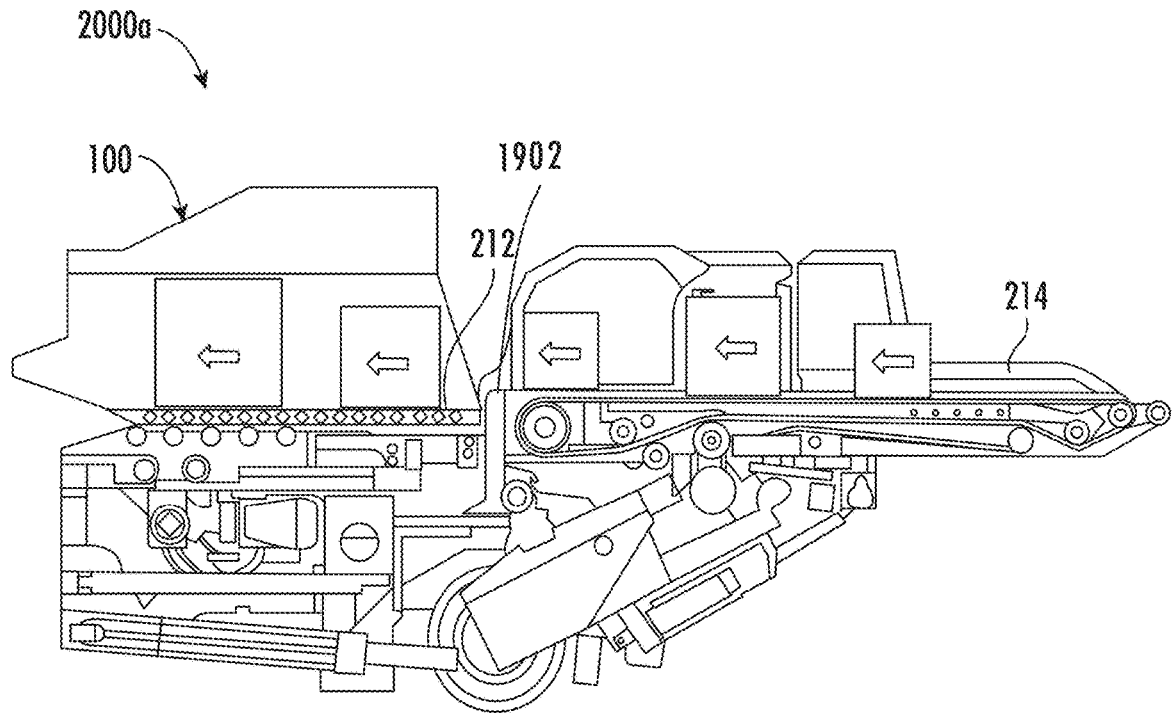
FIG. 20A illustrates a right side view of the nose conveyor surface in a raised position conveying a series of articles, according to one or more embodiments.

FIG. 20A illustrates an illustrative scenario 2000a of operation of the nose conveyor surface 214 in a raised position conveying a series of articles, according to one or more embodiments of the present disclosure. As shown in FIG. 20A, the series of articles may be conveyed in a rearward direction by the nose conveyor surface 214 to the rearward conveyor 212. In an embodiment, the front portion 142 of the conveyor system 110 may further have a transition plate 1902 attached to the nose conveyor surface 214, such that the series of articles may go over the transition plate 1902 when conveyed by the nose conveyor surface 214 in a rearward direction.

Figure 20B:
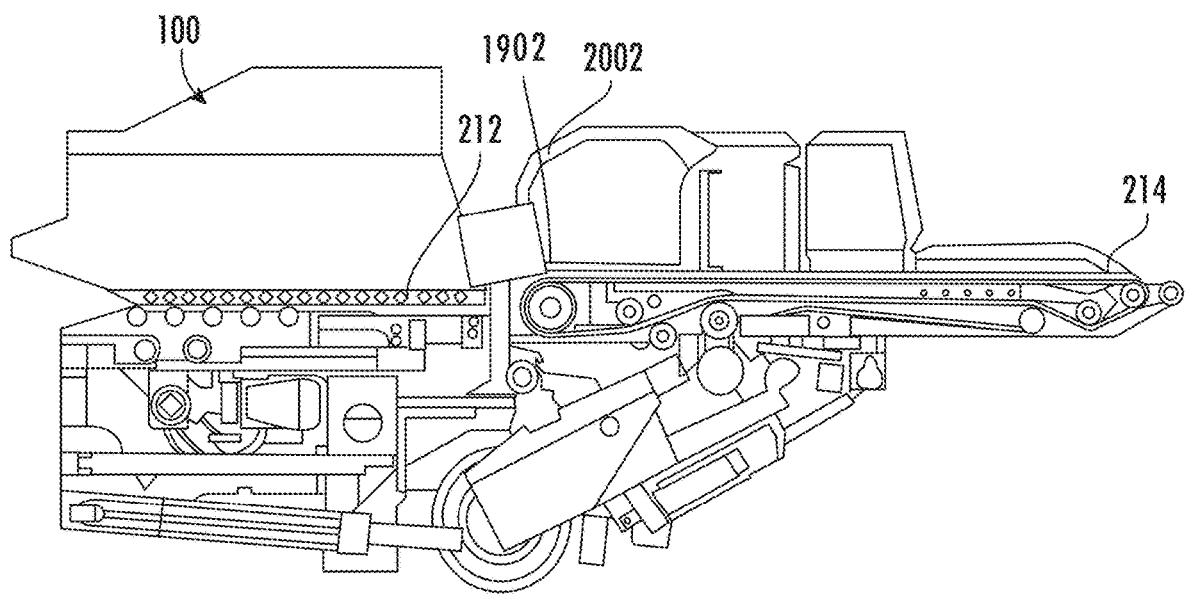
FIG. 20B illustrates a right side view of the nose conveyor surface in the raised position with an article stalled on a transition plate, according to one or more embodiments.
Figure 20C:
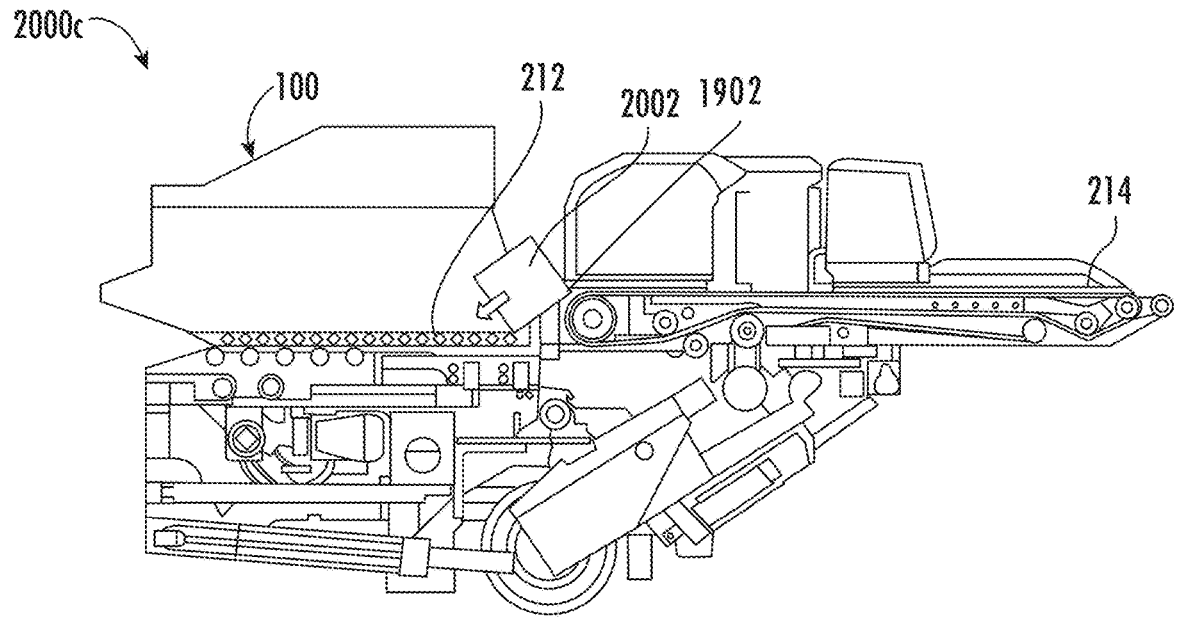
FIG. 20C illustrates a right side view of the nose conveyor surface in an increased raised position with an article being dislodged from the transition plate, according to one or more embodiments.
Figure 20D:
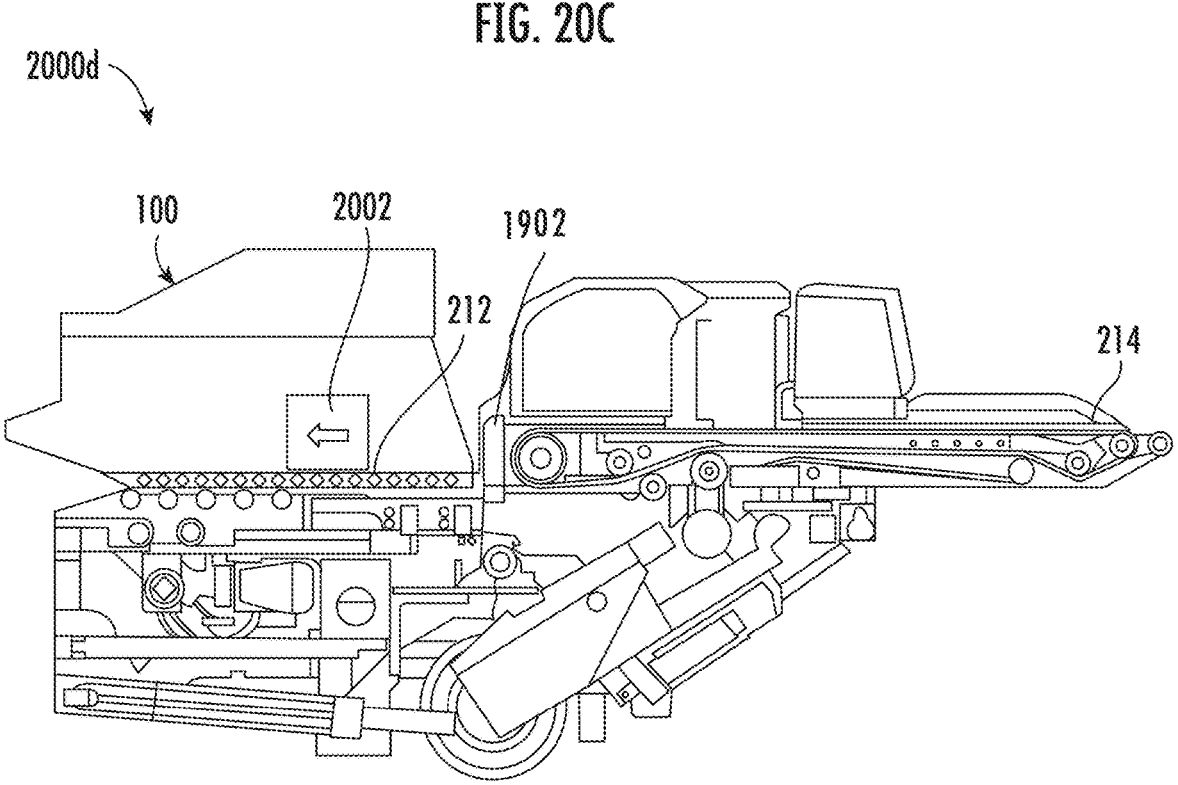
FIG. 20D illustrates a right side view of the nose conveyor surface in the increased raised position with the dislodged article being conveyed on the rearward conveyor, according to one or more embodiments.
Figure 20E:
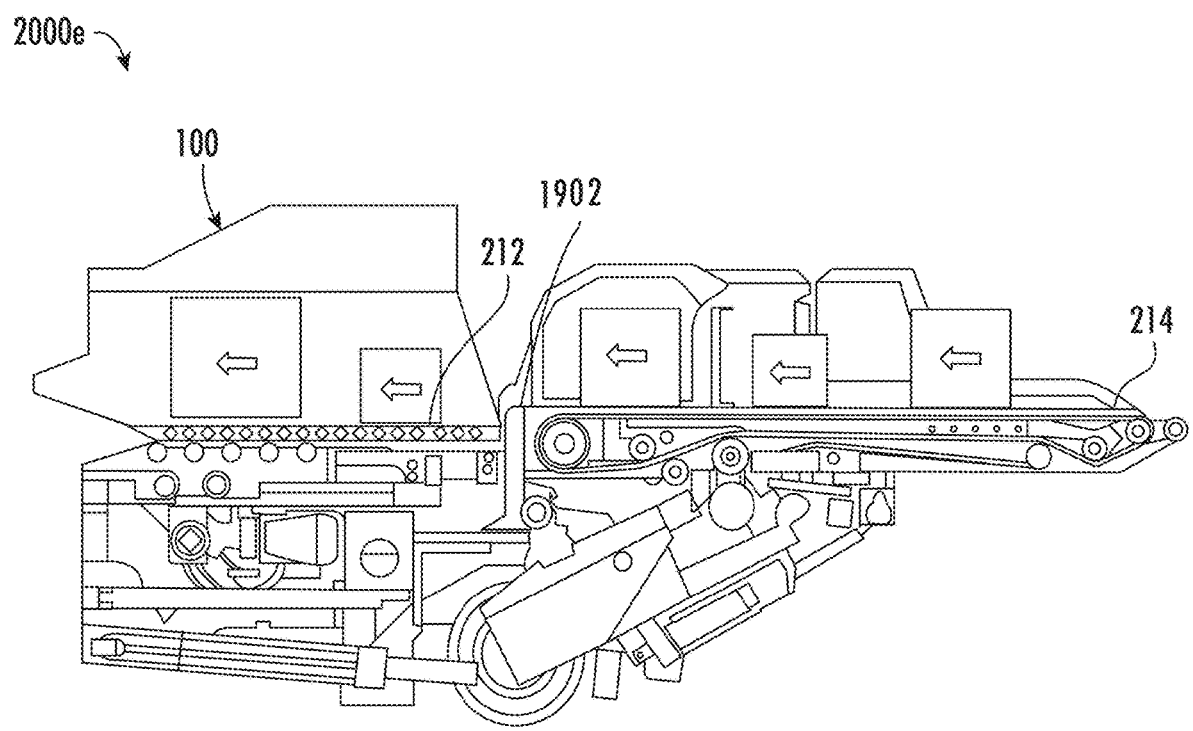
FIG. 20E illustrates a right side view of the nose conveyor surface in homed position discharging article in resumed normal operation, according to one or more embodiments.

FIG. 20B illustrates a scenario 2000b of operation of the robotic material handling system 100 having the nose conveyor surface 214 in a raised position with an article 2002 stalled on the transition plate 1902, according to one or more embodiments of the present disclosure. The robotic material handling system 100 may detect a jam on the transition plate 1902 due to the stalled article 2002 based on data received from the nose IR-RGB-D unit 710 as shown in FIG. 7. In an embodiment, in response to detecting the jam, the robotic material handling system 100 may stop further product flow on the nose conveyor surface 214. FIG. 20C illustrates a scenario 2000c of operation of the robotic material handling system 100 having the nose conveyor surface 214 after a period of time from scenario 2000b, according to one or more embodiments of the present disclosure. As shown in FIG. 20C, the nose conveyor surface 214 may be in an increased raised position with the article 2002 being dislodged from the transition plate 1902, according to one or more embodiments of the present disclosure. In an embodiment, the robotic material handling system 100 on detecting the jam on the transition plate 1902 due to the stalled article 2002, may vertically reposition the nose conveyor surface 214. In an embodiment, the nose conveyor surface 214 may be raised further higher than the position of the nose conveyor surface 214 in the jammed condition (scenario 2000b). When the nose conveyor surface 214 is raised vertically upwards, the transition plate 1902 may be altered and the stalled article 2002 may be freed, as shown in FIG. 20C. For example, jams on the nose conveyor surface 214 may be due to articles stalling on the transition plate 1902. By lifting the nose conveyor surface 214 vertically, the hinged transition plate 1902 can angle more vertically, allowing for gravity to aid in transitioning the article 2002 off the transition plate 1902, and thus clearing the jam. FIG. 20D illustrates a scenario 2000d of operation of the robotic material handling system 100 having the nose conveyor surface 214 after a period of time from scenario 2000c, according to one or more embodiments of the present disclosure. As shown in FIG. 20D, the nose conveyor surface 214 in the increased raised position as in scenario 2000c may dislodge the article 2002 stalled at the transition plate 1902 such that the article 2002 may be conveyed on the rearward conveyor 212. FIG. 20E, illustrates a scenario 2000e of operation of the robotic material handling system 100 having the nose conveyor surface 214 after a period of time from scenario 2000d, according to one or more embodiments of the present disclosure. As shown in FIG. 20E, once the article 2002 is dislodged from the transition plate 1902, the nose conveyor surface 214 may be brought back to the homed position and the robotic material handling system 100 may resume product flow on the nose conveyor surface 214. Once homed, the nose conveyor surface 214 may start discharging a series of articles in resumed normal operation.

Figure 21:
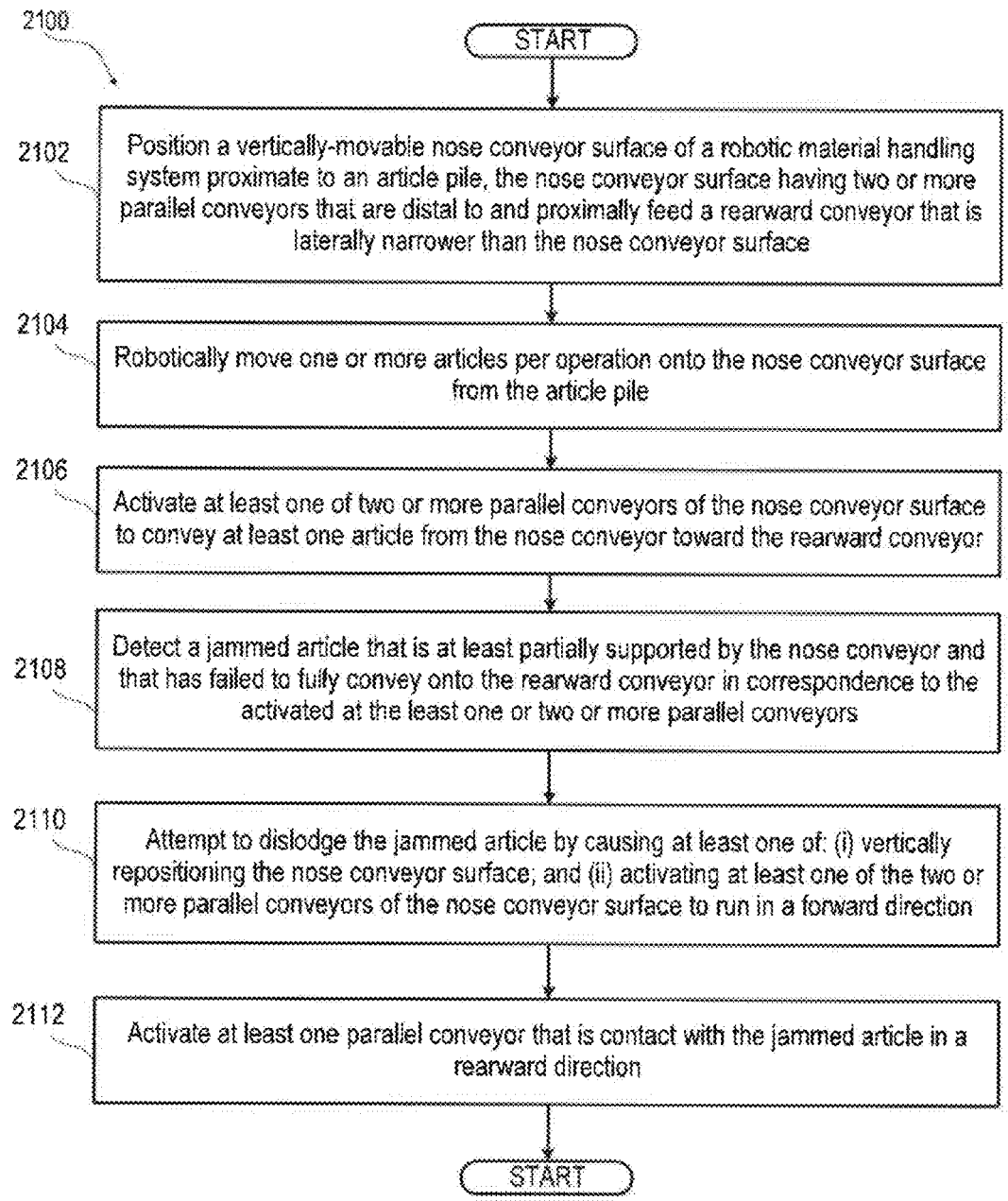
FIG. 21 illustrates a flow diagram of a method of clearing a jam of an article that is at least partially supported on a nose conveyor portion of a robotic material handling system, according to one or more embodiments.

FIG. 21 illustrates a method 2100 of conveying articles on a robotic material handling system. In one or more embodiments, method begins positioning a vertically-movable nose conveyor surface 214 of a robotic material handling system proximate to an article pile. The nose conveyor surface 214 has two or more parallel conveyors that are distal to and proximally feed a rearward conveyor that is laterally narrower than the nose conveyor surface 214 (block 2102). Method 2100 includes robotically moving one or more articles per operation onto the nose conveyor surface 214 from the article pile (block 2104). Method 2100 includes activating at least one of two or more parallel conveyors of the nose conveyor surface 214 to convey at least one article from the nose conveyor toward the rearward conveyor (block 2106). Method 2100 includes detecting a jammed article that is at least partially supported by the nose conveyor and that has failed to fully convey onto the rearward conveyor in correspondence to the activated at least one or two or more parallel conveyors (block 2108). Method 2100 includes attempting to dislodge the jammed article by causing at least one of: (i) vertically repositioning the nose conveyor surface 214; and (ii) activating at least one of the two or more parallel conveyors of the nose conveyor surface 214 to run in a forward direction (block 2110). In an embodiment, the method 2100 is an iterative process using a combination of both (i) and (ii). That is, the jammed article may be attempted to be dislodged by vertically repositioning the nose conveyor surface 214, and if the jam persists, the method 2100 may include activating at least one of the two or more parallel conveyors of the nose conveyor surface 214 to run in a forward direction, as described above. Method 2100 includes activating at least one parallel conveyor that is contact with the jammed article in a rearward direction. Then method 2100 ends.

In one or more embodiments, the method 2100 includes detecting the jammed article by scanning the nose conveyor surface 214 and identifying one or more articles that are present on the nose conveyor surface 214 within respective zones of the two or more parallel conveyors by comparing the scanned nose conveyor surface 214 to a baseline scan of an empty nose conveyor surface 214. The method 2100 may further include tracking the at least one article with in the identified zone of the activated at least one of two or more parallel conveyors of the nose conveyor surface 214 and determining that the at least one article has become the jammed article by failing to convey onto the rearward conveyor 212. In an embodiment, tracking the at least one article within the identified zone may include determining that the at least one article has not indexed to the next zone in a predefined time and/or detecting that the at least one article does not move when the belt under the article associated with the identified zone is commanded to move.

In one or more embodiments; the method 2100 may include attempting to dislodge the jammed article comprises vertically repositioning the nose conveyor surface 214. The method includes activating the at least one parallel conveyor that is contact with the jammed article in a rearward direction comprises activating at least one parallel conveyor of the nose conveyor surface 214 and at least a portion of the rearward conveyor based on a location of the jammed article determined based on data received from the nose IR-RGB-D unit 710 as shown in FIG. 7. In one particular embodiment, method 2100 includes repositioning the nose conveyor surface 214 by raising the nose conveyor surface 214. In one particular embodiment, method 2100 includes repositioning the nose conveyor surface 214 by lowering the nose conveyor surface 214 to a homed position in alignment with the rearward conveyor 212.

In one or more embodiments, method 2100 includes attempting to dislodge the jammed article by activating at least one of the two or more parallel conveyors of the nose conveyor surface 214 to run in a forward direction away from the rearward conveyor. The method includes activating the at least one parallel conveyor that is contact with the jammed article in a rearward direction by activating at least one parallel conveyor of the nose conveyor surface 214. In an exemplary embodiment, method 2100 includes activating at least one of the two or more parallel conveyors of the nose conveyor surface 214 to run in a forward direction away from the rearward conveyor. Method 2100 includes activating at least another one of the two or more parallel simultaneously with the at least one of the two or more parallel conveyors in a rearward direction to rotate the jammed article into longitudinal alignment with the rearward conveyor.

Figure 22:
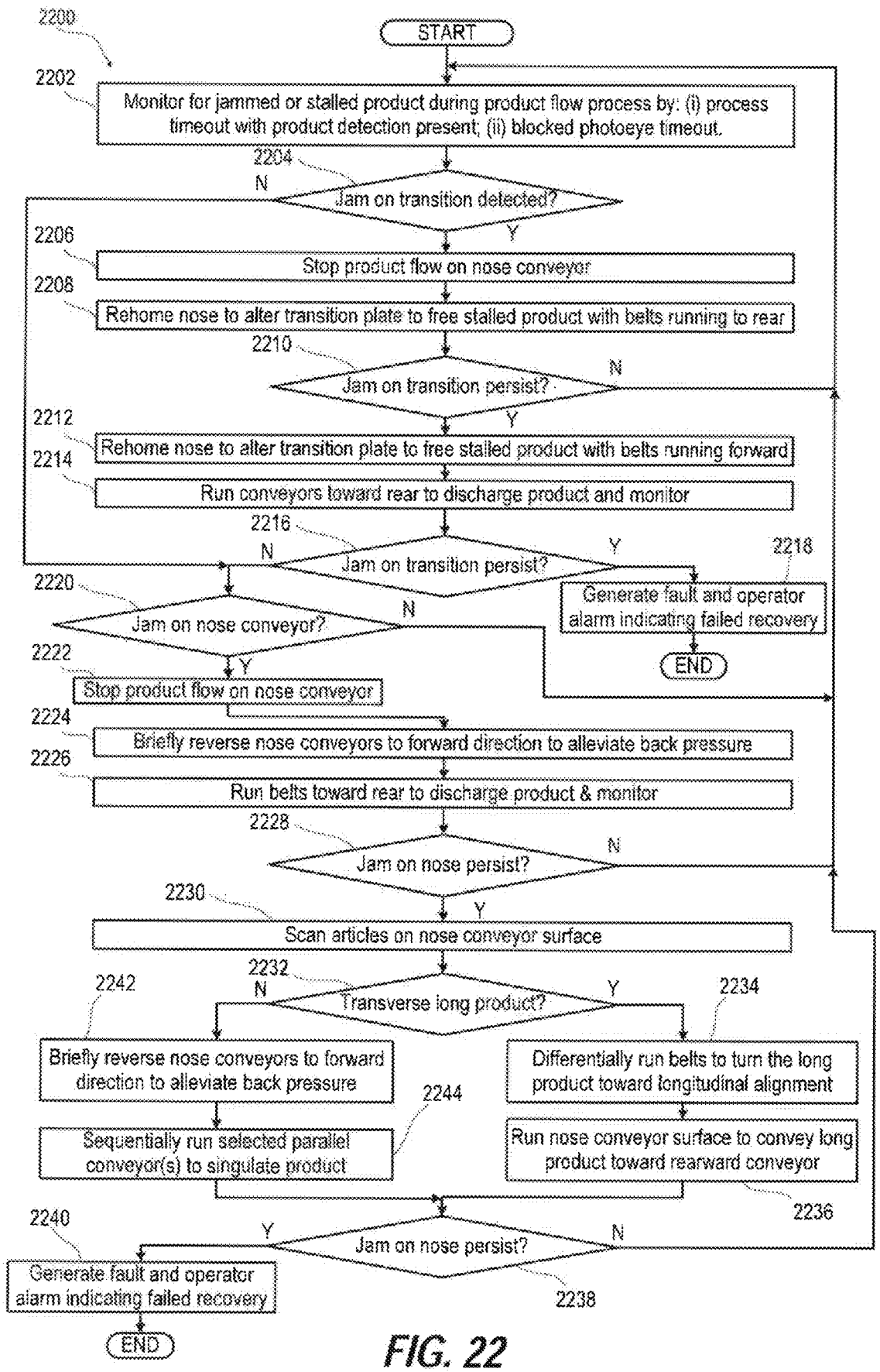
FIG. 22 illustrates a flow diagram of an exemplary method of clearing a jam of an article that is at least partially supported on a nose conveyor portion of a robotic material handling system, according to one or more embodiments.

FIG. 22 illustrates a method of an exemplary method 2200 of clearing a jam of an article that is at least partially supported on a nose conveyor portion of a robotic material handling system. According to one or more embodiments, method 2200 begins monitoring for jammed or stalled product during product flow process by: (i) process timeout with product detection present; (ii) blocked photoeye timeout (block 2202). The term "process timeout" as used herein might refer to a factor of expected time to clear a product based on a predefined speed of the conveyor belt. The term "photoeye timeout" as used herein might refer to a factor of expected time to clear a product based on conveyor belt speed and largest product size. A determination is made as to whether a jam is detected on a transition between the nose conveyor surface 214 and the rearward conveyor on a transition plate (decision block 2204). In response to determining that a jam on the transition plate exists, controller stops product flow on nose conveyor (block 2206). Method 2200 include rehoming nose to alter transition plate to free stalled product with belts running forward toward article pile (block 2208). A determination is made as to whether the jam at the transition persists (decision block 2210). In response to determining that the jam is cleared, method 2200 returns to block 2202 to continue monitoring for additional jams. In response to determining that the jam is not cleared, method 2200 includes include rehoming nose to alter transition plate to free stalled product with belts running to the rear (block 2212). Method 2200 includes running conveyors toward rear to discharge product and monitoring results (block 2214). A determination is made as to whether the jam at the transition persists (decision block 2216). In response to determining that the jam persists, the controller generates a fault and an operator alarm indicating failed recovery (block 2218). Then method 2200 ends.

In response to determining that the jam at the transition does not persist in decision block 2216 or after determining that a jam did not exist on at the transition back at decision block 2204, method 2100 includes a further determination of whether a jam exists on the nose conveyor (decision block 2220). In response to determining that a jam does not exist on the nose conveyor, method 2200 returns to block 2202 to continue monitoring for jams. In response to determining that a jam does exist on the nose conveyor, method 2200 includes stopping product flow on the nose conveyor (block 2222). Controller briefly reverses nose conveyor to run forward in direction to alleviate back pressure (block 2224). The term "back pressure" as used herein might refer to a pressure applied to the jammed product by additional product behind the jam in the direction of product flow. Back pressure is generally expected when a jam occurs while trying to have a large amount of product flow. Method 2200 includes running conveyors such as parallel belt conveyors, toward rear to discharge product and monitors the results (block 2226).

Method 2200 includes determining whether a jam persists on the nose conveyor (decision block 2228). If no jam is determined to exist on the nose conveyor, then method 2200 returns to block 2202 to continue monitoring for jams on the forward portion of the robotic material handling system. If no jam is determined to on the nose conveyor, then method 2200 includes scanning for articles on the nose conveyor surface 214 (block 2230). A determination is made as to whether a long product has jammed in a transverse alignment across the nose conveyor (decision block 2232). In response to determining that a long product is transversely aligned, method 2200 includes differentially running belts of the nose conveyor to turn the long product toward a longitudinal alignment (block 2234). Differentially running belts may include running each belt at different speed, direction, and/or a combination thereof, as described above with reference to FIG. 18B. Method 2200 includes running the nose conveyor surface 214 toward the rearward conveyor to convey the long product (block 2236). A determination is made as to whether the jam persists on the nose conveyor (decision block 2238). In response to determining that the jam does not persist on the nose conveyor, method 2200 returns to block 2202 to continue monitoring for jams on the forward portion of the robotic material handling system. In response to determining that the jam does persist on the nose conveyor, method 2200 includes generating a fault and operator alarm indicating that the recovery has failed (block 2240). Then method 2200.

In response to determining that no long products are transverse across the nose conveyor in decision block 2232, then the controller briefly reverses the nose conveyor to a forward direction to alleviate back pressure (block 2242). Method 2200 includes sequentially runs selected parallel belt conveyor(s) to singulate product off of the nose conveyor (block 2244). The method 2200 proceeds to block 2238 to determine whether or not the jam is cleared.

As used herein, processors may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For clarity, the robotic material handling system 100 (FIG. 1) is described herein as unloading cartons, which can be corrugated boxes, wooden crates, polymer or resin totes, storage containers, etc. The manipulator head can further engage articles that are products that are shrink-wrapped together or a unitary product. In one or more embodiments, aspects of the present innovation can be extended to other types of manipulator heads that are particularly suited to certain types of containers or products. The manipulator head can employ mechanical gripping devices, electrostatic adhesive surfaces, electromagnetic attraction, etc. Aspects of the present innovation can also be employed on a single conventional articulated arm.

For purposes of detecting jams, the vision capabilities described herein can have certain advantages. However, aspects of the present innovation can be implemented with our types of sensing. For example, the surface of the independently controllable conveyors can have sensors that detect the weight of an article. Alternatively, a plurality of photo eyes can crisscross the conveyor to detect the presence of articles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of conveying articles on a robotic material handling system, the method comprising:
positioning a nose conveyor surface of the robotic material handling system proximate to an article pile, the nose conveyor surface being vertically-movable and having two or more parallel conveyors that are distal to and feed a rearward conveyor, the rearward conveyor being laterally narrower than the nose conveyor surface;
robotically moving one or more articles onto the nose conveyor surface from the article pile;
activating at least one of the two or more parallel conveyors of the nose conveyor surface to convey at least one article from the nose conveyor surface toward the rearward conveyor;
detecting a jammed article that is at least partially supported by the nose conveyor surface and that has failed to be fully conveyed onto the rearward conveyor by the at least one of the two or more parallel conveyors;
dislodging the jammed article by causing at least one of: (i) vertically repositioning the nose conveyor surface; and (ii) activating the at least one of the two or more parallel conveyors of the nose conveyor surface to run in a forward direction;
activating at least one parallel conveyor that is in contact with the jammed article in a rearward direction to convey a portion of the jammed article in the rearward direction; and
activating the two or more parallel conveyors in the rearward direction to convey remaining portions of the jammed article in the rearward direction.

2. The method of claim 1, wherein detecting the jammed article comprises:
scanning the nose conveyor surface;
identifying one or more articles that are present on the nose conveyor surface within respective zones of the two or more parallel conveyors by comparing the scanned nose conveyor surface to a baseline scan of an empty nose conveyor surface;
tracking the at least one article within an identified zone of the at least one of the two or more parallel conveyors of the nose conveyor surface; and based on tracking the at least one article, determining that the at least one article has become the jammed article by failing to be conveyed onto the rearward conveyor.

3. The method of claim 1, wherein:
dislodging the jammed article comprises vertically repositioning the nose conveyor surface; and
activating the at least one parallel conveyor that is contact with the jammed article in the rearward direction comprises activating the at least one parallel conveyor of the nose conveyor surface and at least a portion of the rearward conveyor.

4. The method of claim 3, wherein repositioning the nose conveyor surface comprises raising the nose conveyor surface.

5. The method of claim 3, wherein repositioning the nose conveyor surface comprises lowering the nose conveyor surface to a homed position in alignment with the rearward conveyor.

6. The method of claim 1, wherein:
dislodging the jammed article comprises activating at least one of the two or more parallel conveyors of the nose conveyor surface to run in the forward direction away from the rearward conveyor.

7. The method of claim 6, further comprising:
activating at least another one of the two or more parallel conveyors simultaneously with the at least one of the two or more parallel conveyors in the rearward direction to rotate the jammed article into longitudinal alignment with the rearward conveyor.

8. A robotic material handling system for unloading articles in an article pile, the robotic material handling system comprising:
a mobile body;
a movable robotic manipulator attached to the mobile body and comprising an end effector at an end, the end effector being configured to unload one or more articles from the article pile;
a conveyor system mounted on the mobile body configured to receive the one or more articles from the end effector and to move the one or more articles towards a rear of the robotic material handling system, the conveyor system comprising:
(i) a nose conveyor surface and
(ii) a rearward conveyor,
the nose conveyor surface having two or more parallel conveyors that are distal to and feed the rearward conveyor that is laterally narrower than the nose conveyor surface;
an article detection system; and
a controller in communication with the article detection system, the mobile body, the movable robotic manipulator, and the conveyor system, the controller being configured to:
cause the nose conveyor surface of the robotic material handling system to be positioned proximate to the article pile, the nose conveyor surface being vertically-movable;
cause the movable robotic manipulator to move the one or more articles onto the nose conveyor surface from the article pile;
activate at least one of two or more parallel conveyors of the nose conveyor surface to convey at least one article from the nose conveyor surface toward the rearward conveyor;
detect a jammed article that is at least partially supported by the nose conveyor surface and that has failed to be fully conveyed onto the rearward conveyor by the at the least one of the two or more parallel conveyors; and
dislodge the jammed article by causing at least one of: (i) vertically repositioning the nose conveyor surface; and (ii) activating the at least one of the two or more parallel conveyors of the nose conveyor surface to run in a forward direction;
activating at least one parallel conveyor that is in contact with the jammed article in a rearward direction to convey a portion of the jammed article in the rearward direction; and
activating the two or more parallel conveyors in the rearward direction to convey remaining portions of the jammed article in the rearward direction.

9. The robotic material handling system of claim 8, wherein the article detection system comprises:
one or more sensors coupled respectively to one of the mobile body and the movable robotic manipulator to scan the nose conveyor surface;
a scan processing subsystem in communication with the one or more sensors, the scan processing subsystem to detect presence and location of any articles based upon a received scan of the nose conveyor surface as compared to a baseline scan; and
wherein the controller in communication with the scan processing subsystem detects the jammed article by:
scanning, by the one or more sensors, the nose conveyor surface;
identifying, by the scan processing subsystem, one or more articles that are present on the nose conveyor surface within respective zones of the two or more parallel conveyors by comparing the scanned nose conveyor surface to a baseline scan of an empty nose conveyor surface;
tracking the at least one article within an identified zone of the at least one of two or more parallel conveyors of the nose conveyor surface; and
based on tracking the at least one article, determining that the at least one article has become the jammed article by failing to be conveyed onto the rearward conveyor.

10. The robotic material handling system of claim 8, wherein the controller is further configured to dislodge the jammed article by vertically repositioning the nose conveyor surface to a selected one of: (i) raising the nose conveyor surface relative to the rearward conveyor; and (ii) lowering the nose conveyor surface to a homed position in alignment with the rearward conveyor, wherein activating the at least one parallel conveyor that is in contact with the jammed article in the rearward direction comprises activating the at least one parallel conveyor of the nose conveyor surface and at least a portion of the rearward conveyor.

11. The robotic material handling system of claim 8, wherein dislodging the jammed article comprises activating at least one of the two or more parallel conveyors of the nose conveyor surface to run in the forward direction away from the rearward conveyor.

12. The robotic material handling system of claim 11, wherein the controller is further configured to:
activate at least another one of the two or more parallel conveyors simultaneously with the at least one of the two or more parallel conveyors in the rearward direction to rotate the jammed article into longitudinal alignment with the rearward conveyor.

13. A controller of a robotic material handling system that conveys articles from an article pile, the controller comprising a computer-readable storage medium containing instructions that, when executed by a processor, cause the robotic material handling system to:

position a nose conveyor surface of the robotic material handling system proximate to the article pile, the nose conveyor surface being vertically-movable and having two or more parallel conveyors that are distal to and feed a rearward conveyor, the rearward conveyor being laterally narrower than the nose conveyor surface;

robotically move one or more articles onto the nose conveyor surface from the article pile;

activate at least one of the two or more parallel conveyors of the nose conveyor surface to convey at least one article from the nose conveyor surface toward the rearward conveyor;

detect a jammed article that is at least partially supported by the nose conveyor surface and that has failed to be fully conveyed onto the rearward conveyor by the at least one of the two or more parallel conveyors; and dislodge the jammed article by causing at least one of: (i) vertically repositioning the nose conveyor surface; and (ii) activating the at least one of the two or more parallel conveyors of the nose conveyor surface to run in a forward direction; and activate at least one parallel conveyor that is in contact with the jammed article in a rearward direction.

14. The controller of claim 13, wherein the instructions cause the robotic material handling system to detect the jammed article by:

scanning the nose conveyor surface;

identifying one or more articles that are present on the nose conveyor surface within respective zones of the two or more parallel conveyors by comparing the scanned nose conveyor surface to a baseline scan of an empty nose conveyor surface;

tracking the at least one article within an identified zone of the at least one of the two or more parallel conveyors of the nose conveyor surface; and based on tracking the at least one article, determining that the at least one article has become the jammed article by failing to be conveyed onto the rearward conveyor.

15. The controller of claim 13, wherein the instructions cause the robotic material handling system to:

dislodge the jammed article by vertically repositioning the nose conveyor surface to a selected one of: (i) raising the nose conveyor surface relative to the rearward conveyor; and (ii) lowering the nose conveyor surface to a homed position in alignment with the rearward conveyor; and activate the at least one parallel conveyor that is in contact with the jammed article in the rearward direction comprises activating the at least one parallel conveyor of the nose conveyor surface and at least a portion of the rearward conveyor.

16. The controller of claim 13, dislodging the jammed article comprises activating at least one of the two or more parallel conveyors of the nose conveyor surface to run in the forward direction away from the rearward conveyor.

17. The controller of claim 16, wherein the instructions cause the robotic material handling system to:

activate at least another one of the two or more parallel conveyors simultaneously with the at least one of the two or more parallel conveyors in the rearward direction to rotate the jammed article into longitudinal alignment with the rearward conveyor.

\* \* \* \* \*